(12) United States Patent
Shah et al.

(10) Patent No.: US 8,412,632 B2
(45) Date of Patent: Apr. 2, 2013

(54) PERFORMING A CHECK TRANSACTION USING ADD-IN MODULES

(75) Inventors: Mehul Shah, Redmond, WA (US); Himanshu Lal, Mercer Island, WA (US); Daniel L. Reed, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 888 days.

(21) Appl. No.: 12/129,684

(22) Filed: May 30, 2008

(65) Prior Publication Data

US 2009/0299863 A1 Dec. 3, 2009

(51) Int. Cl.
*G06Q 40/00* (2012.01)
(52) U.S. Cl. .......................................................... 705/45
(58) Field of Classification Search .................. 705/45
See application file for complete search history.

(56) References Cited

U.S. PATENT DOCUMENTS

| | | | |
|---|---|---|---|
| 5,679,938 A | 10/1997 | Templeton et al. | |
| 6,644,546 B2 | 11/2003 | George et al. | |
| 6,647,376 B1 | 11/2003 | Farrar et al. | |
| 6,754,640 B2 | 6/2004 | Bozeman | |
| 2002/0026365 A1 | 2/2002 | Natanzon | |
| 2002/0178112 A1 | 11/2002 | Goeller et al. | |
| 2003/0050892 A1 | 3/2003 | Clynes et al. | |
| 2003/0219122 A1* | 11/2003 | Ramirez et al. ................ | 380/54 |
| 2003/0229590 A1* | 12/2003 | Byrne et al. .................... | 705/40 |
| 2004/0044606 A1 | 3/2004 | Buttridge et al. | |
| 2004/0104268 A1* | 6/2004 | Bailey ........................... | 235/439 |
| 2004/0193522 A1 | 9/2004 | Binet et al. | |
| 2008/0029592 A1 | 2/2008 | Manfre et al. | |
| 2009/0150234 A1* | 6/2009 | Darst et al. .................... | 705/14 |

OTHER PUBLICATIONS

"Electronic Check Service," NOVA Information Systems, Inc., available at <<http://www.novainfo.com/documents/ECS%20-% 20multi% 20Lane%20Retail%20Check%20Solution.pdf>>, 2006 , pp. 1-4.
"Electronic Check Truncation," Takepayment.com, available at <<http://www.takepayment.com/checkservices.htm>>, pp. 1-3.
"eCheck.Net Operating Procedures and User Guide," eCheck.Net, available at <<http://www.authorize.net/files/echecknetuserguide.pdf>>, 2007, pp. 1-69.
"TeleCheck Electronic Check Acceptance (ECA) Verification with TRS Collections Service," First Data Corporation, available at <<http://www.nationalgrocers.org/Operational%20Prog%20Services/First%20Data-030607/S-ECA%20Verificationw-TRS%20collections.pdf>>, 2006, pp. 1-2.

* cited by examiner

*Primary Examiner* — Hani M Kazimi
*Assistant Examiner* — Hatem M Ali
(74) *Attorney, Agent, or Firm* — Hope Baldauff Hartman, LLC

(57) ABSTRACT

A point-of-sale (POS) module and associated methods are described for performing a transaction involving a check. The POS module interacts with one or more add-in modules. Each add-in module is associated with a particular method for processing a payment using a check. Accordingly, the POS module can accommodate multiple different workflows by plugging in appropriate add-in modules.

18 Claims, 16 Drawing Sheets

PERFORMING A CHECK TRANSACTION USING ADD-IN MODULES

BACKGROUND

Many businesses commonly allow customers to submit checks as a form of payment. In a traditional scenario, a business may ask a customer who offers a check to present one or more forms of identification. Based on this information, the business may decide to accept or decline the check as payment. Some time later, the business provides a collection of accepted checks to a bank for processing and settlement.

The traditional mode of check payment has drawbacks. First, the business has no assurance that the customer's check is a valid instrument that will be honored by the bank. Second, it may be inconvenient and inefficient for the business to physically transport the checks to the bank for processing.

In view of these shortcomings, some businesses use more advanced methods of processing checks. One such method is referred to herein as a verification method. In the verification method, at the time of transaction, the business may make an electronic inquiry to a service provider. The inquiry asks the service provider to verify whether the customer's account is valid and in good standing. The service provider may also optionally verify that the customer has sufficient funds to make the payment. As in the traditional method, the verification method requires the business to retain checks for later physical settlement at the bank. Further, despite the safeguards provided by advance verification, there remains a chance that the bank may not honor a customer's check.

Another proposed method for processing checks is referred to herein as an electronic transaction method. In the electronic transaction method, the business converts the customer's check to an electronic transaction. Using this method, a service provider can transfer appropriate funds from the customer's account to the business's account. To authorize such a transaction, the business may ask the customer to sign a printed receipt. The business also may void the customer's paper check to prevent it from being used again. The electronic transaction method dispenses with the need for the business to physically submit checks for settlement at the bank.

Currently, a service provider may provide specialized single-use functionality to process a check in accordance with a particular kind of check processing method. A business which desires to use such a check processing method may purchase or otherwise acquire the specialized functionality. This approach may have drawbacks. For instance, it may be a time-consuming, disruptive, and potentially expensive task for the business to replace existing payment functionality with new payment functionality.

SUMMARY

In one illustrative implementation, a point-of-sale (POS) module is provided for performing a transaction involving a check. The POS module interacts with at least one add-in module. Each add-in module performs specialized processing associated with a particular method of payment using a check. Accordingly, when a particular method of check payment is selected at the time of a transaction, the POS module performs the transaction in cooperation with an add-in module associated with the selected method of payment. For example, the POS module may submit an authorization request to an appropriate add-in module; the add-in module may perform specialized authorization processing and return an authorization response to the POS module indicating whether the transaction is approved.

By virtue of the above-summarized features, the POS module may accommodate the use of different transaction workflows associated with different payment methods. A business can implement a new check payment method by "plugging in" a new add-in module associated with the new method. This aspect of the POS module allows a business to efficiently and flexibly incorporate new payment tools. Further, this approach readily accommodates a business which may wish to offer multiple forms of payment to its customers.

In one illustrative case, the POS module can accommodate at least three methods of payment using a check. A verification method involves electronically verifying that the check may be used as payment. An electronic transaction method involves converting the check into an electronic transaction. A traditional method involves neither verifying the check nor converting the check into electronic form.

According to another illustrative feature, the POS module includes a POS-to-add-in interface module which couples the POS module to each add-in module. The POS-to-add-in interface module handles the interaction between the POS module and each add-in module using an appropriate protocol. A service provider can design a new add-in module to interact with the POS module by ensuring that the add-in module conforms to the appropriate protocol.

According to another illustrative feature, the POS module may include a configuration module for allowing a user to configure the POS module to operate using one or more transaction workflows. One or more transaction workflows may involve the use of one or more respective add-in modules. The configuration operation may involve configuring such add-in modules. In the course of the configuration operation, an add-in module itself may invoke its own configuration procedure, which may involve presenting one or more user interface pages.

According to another illustrative feature, the POS module may include a settlement module. The settlement module handles settlement of one or more transactions performed by the POS module. The settlement operation may entail interaction with one or more appropriate add-in modules. The add-in modules perform specialized settlement operations appropriate to respective methods of payment.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure describes an approach for performing a transaction involving a check. In this approach, a point-of-sale (POS) module interacts with one or more add-in modules via an interface protocol. The add-in modules are associated with different respective methods for check processing. Accordingly, the POS module can efficiently and flexibly accommodate multiple different workflows by plugging in appropriate add-in modules.

The term "user" as used herein refers to any entity for interacting with the POS module. In a set-up (configuration) stage, the user may correspond to an administrative-type user. In a transaction stage, the user may correspond to a cashier or the like. If a self-check-out model is used, the user may correspond to the customer herself.

This disclosure is organized as follows. Section A describes illustrative systems and devices that use the above-summarized add-in approach for performing a check transaction. Section B describes illustrative methods associated with the add-in approach. Section C describes illustrative processing functionality that can be used to implement any aspect of the features described in Sections A and B.

A. Illustrative Systems

Figure 21:
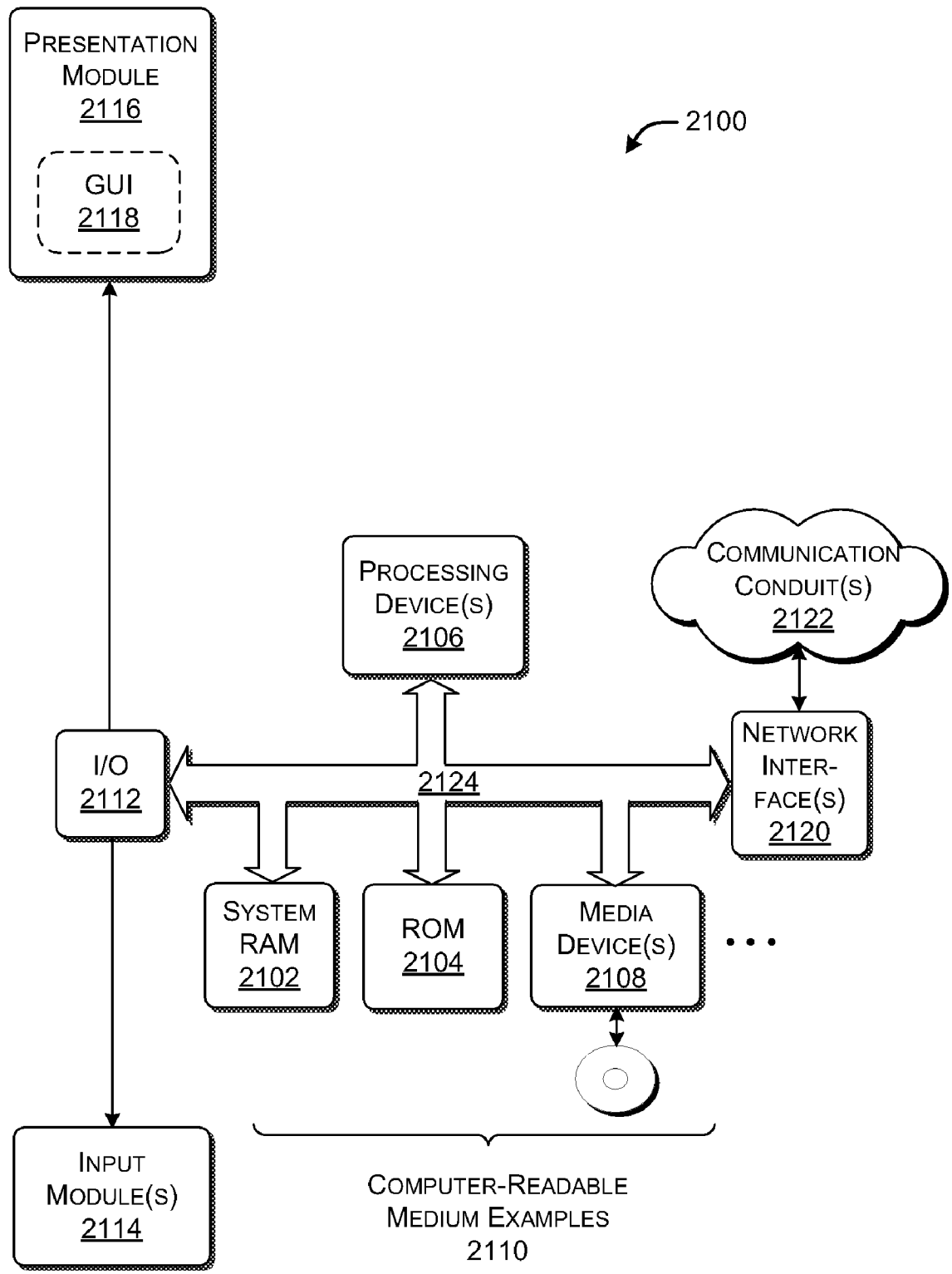
FIG. 21 shows illustrative processing functionality that can be used to implement any aspect of the features shown in the foregoing drawings.

As a preliminary matter, the various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, the depiction of any two or more separate components in the figures may reflect different functions performed by a single physical component. Alternatively, or in addition, any single component illustrated in the figures can be implemented by plural physical components. FIG. 21, to be discussed in turn, provides additional details regarding one illustrative implementation of the functions shown in the figures.

Figure 1:
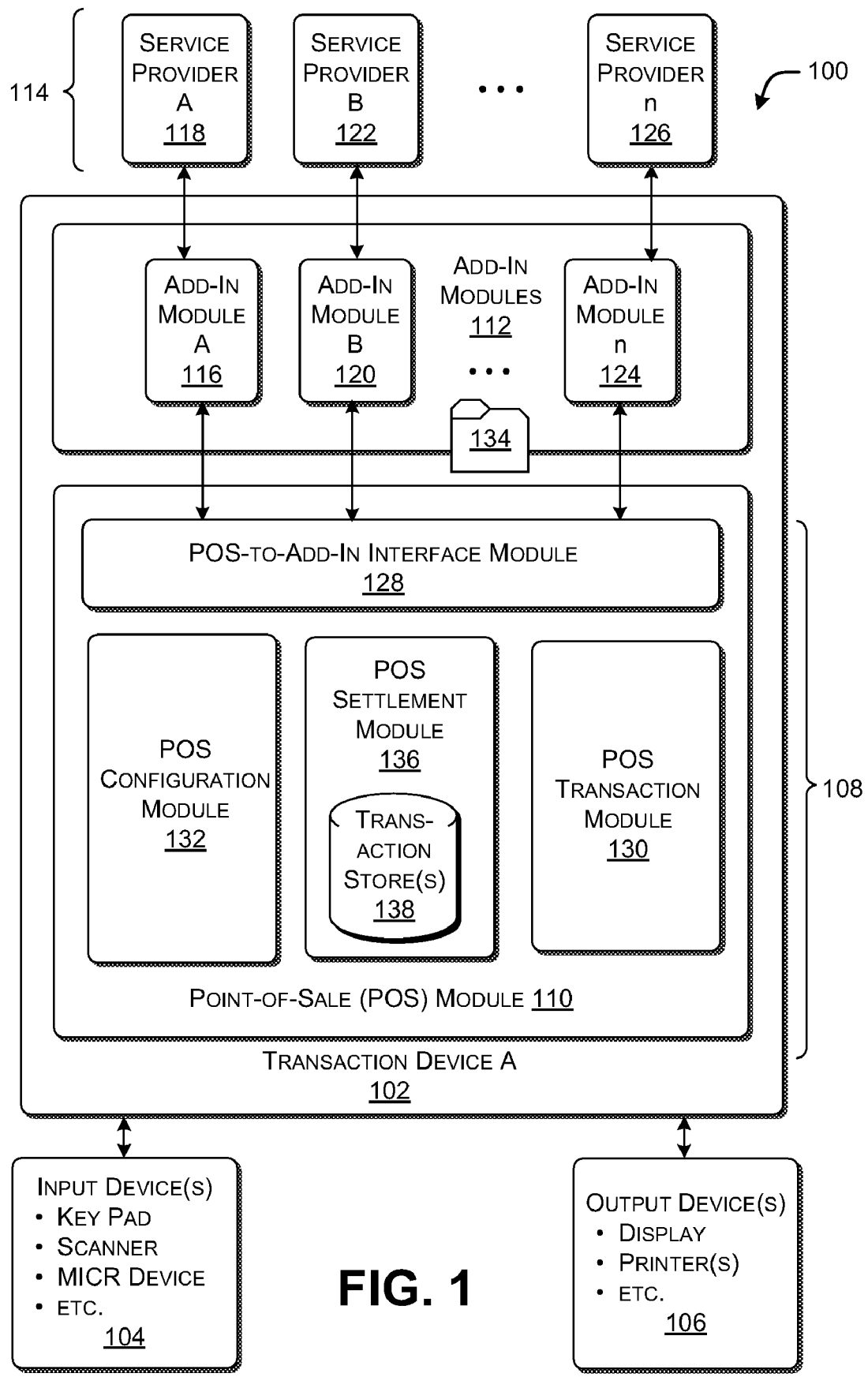
FIG. 1 shows an illustrative system that makes use of a point-of-sale (POS) module in cooperation with one or more add-in modules to perform a check transaction.

FIG. 1 shows a system 100 for performing a transaction using a check. The system 100 shows the use of a single transaction device 102. However, as will be set forth in the context of FIG. 6, the system 100 can include plural transaction devices.

In one case, the transaction device 102 is placed in a business (such as a retail store). In this setting, the transaction device 102 enables a customer to pay for goods and/or services provided by the business. However, the transaction device 102 is not limited to retail environments, and, indeed, is not limited to business environments. In another case, the transaction device 102 can be used by a funds transfer entity. In this context, the transaction device 102 is used to accept payment from a customer for the purpose of transferring funds from the customer's account to any target account (where such a transaction is not necessarily associated with a purchase of goods and/or services). However, to facilitate explanation, the remaining description will set forth the features of the transaction device 102 in the illustrative context of the purchase of goods and/or services.

In one case, the transaction device 102 can correspond to a general purpose computing device that is programmed to handle transactions. In another case, the transaction device 102 may correspond to a special-purpose device for performing transactions. In any event, the transaction device 102 can interact with typical transaction-related periphery devices. The periphery devices can include one or more input devices 104, such as key pad, a touch screen input device, a bar code scanner, a check reader (such as a conventional magnetic ink character reader device), and so forth. The periphery devices can also include or more output devices 106, such as a display, a check printer (for printing information on checks), one or more receipt printers, a coupon printer, and so on.

The transaction device 102 can include transaction functionality 108 for performing transactions. The transaction functionality 108 can be implemented using software, hardware, firmware, etc., or any combination thereof. The transaction functionality 108, in turn, includes a point-of-sale (POS) module 110 and at least one of add-in module 112 (henceforth referred to in the plural as a group of add-in modules 112). The POS module 110 provides base functionality for performing transactions using a plurality of selectable transaction flows associated with different methods of payment using a check. Each of the add-in modules 112 provides specialized functionality for performing a transaction according to a particular method of check payment. At the time of a transaction, a user selects a method to make a payment using a check. Based on this selection, the POS module 110 cooperates with an appropriate add-in module to perform the transaction according to the selected method.

Each of the add-in modules 112 may interact with respective service providers 114 to provide specialized respective processing of check transactions. For example, representative add-in module A 116 interacts with service provider A 118. Representative add-in module B 120 interacts with service provider B 122. Representative add-in module n 124 interacts with service provider n 126.

In one case, a service provider may correspond to a financial institution which sponsors a particular type of payment using a check. For example, service provider A 118 may sponsor an electronic transaction method for check processing. In this method, the check is converted to an electronic transaction, whereupon the funds are transferred from the customer's account to the business's account without requiring the business to manually deposit the check for settlement. Other service providers can also implement the electronic transaction method of processing a check, but potentially in different ways than service provider A 118. At configuration time, a user may configure the transaction functionality 108 to interact with a particular type of service provider that implements the electronic transaction method of check processing (if this method is to be used by a particular business).

Service provider B 122 may sponsor a verification method for check processing. In this method, at the time of transaction, the business contacts the service provider 122 to determine whether the customer's account is in good standing, and optionally whether the customer's account has sufficient funds to pay for the purchased items. Other service providers can also implement the verification method of processing a check, but potentially in different ways than service provider B 122. At configuration time, a user may configure the transaction functionality 108 to interact with a particular type of service provider that implements the verification method of check processing (if this method is to be used by a particular business).

The service providers 114 may design the add-in modules 112 to implement the check payment methods that they respectively sponsor. For example, supposing that the service provider A 118 provides an electronic transaction method of payment, it may design the add-in module A 116 so that it implements the electronic transaction method of payment. Supposing that the service provider B 122 provides the verification method of payment, it may design the add-in module B 120 so that it implements the verification method of payment. Each service provider may use an associated protocol to interact with its add-in module. Thus add-in module A 116 may use a first protocol to communicate with service provider A 118, while add-in module B 120 uses a second protocol to communicate with its own service provider B 122, where the first protocol differs from the second protocol.

Two methods of check payment were identified above: the electronic check method of payment and the verification method of payment. These methods were mentioned by way of example, not limitation. For example, as will be described, the POS module 110 provides generic processing functionality for performing transactions using many different workflows. This enables the POS module 110 to interact with many different add-in modules 112 associated with many different respective methods of payment. Indeed, the POS module 110 is generically designed so that it can accommodate new check payment methods that were not specifically contemplated at the time of the design of the POS module 110 itself. Moreover, the transaction functionality 108 need not implement the electronic transaction method of payment or the verification method of payment; that is, it can omit either or these methods, or both of these methods.

The universality of the POS module 110 ensues, in part, from the use of a POS-to-add-in interface module 128. As the name suggests, the POS-to-add-in interface module 128 allows the POS module 128 to interact with the add-in modules 112. The POS-to-add-in interface module 128 governs this interaction using a protocol or contract. The protocol specifies that certain message exchanges take place between the POS module 110 and the add-in modules 112. One implementation of these message exchanges is described in detail below with respect to FIGS. 3-5. Thus, a new service provider can ensure compatibility of its services with the POS module 110 by designing an add-in module that conforms to the appropriate protocol. In one illustrative but non-limiting case, the POS-to-add-in interface module 128 can be implemented using a collection of application programming interfaces (APIs). The APIs can make calls into the add-in modules 112 and receive responses from the add-in modules.

The POS module 110 includes (or can be conceptualized to include) multiple component modules for performing different respective functions. One such component module is a POS transaction module 130. The POS transaction module 130 governs the overall flow of a transaction depending on the method of payment selected by the user (e.g., the cashier). Because there may be multiple methods of payment to choose from, the POS transaction module 130 is designed to accommodate multiple transaction flows.

A POS configuration module 132 configures the POS module 110 in a set-up stage of operation. For example, the POS configuration module 132 identifies workflows that may be selected. A subset of the workflows may ask the user to select one or more add-in modules 112. When enumerating the workflow choices, the POS configuration module 132 can look for the available add-in modules 112 within a predetermined folder 134. Each of the add-in modules 112 is uniquely identified by the POS module 110. The result of the configuration operation is configuration information that is specific to the add-in modules 112. The transaction functionality 108 can store the configuration information at any location (or at a plurality of locations), such as in the affected add-in module(s), within the POS configuration module 132, and so on. As will be discussed below (with reference to FIG. 6), the POS configuration module 132 can also coordinate the dissemination of the configuration information to other transaction devices.

The set-up operation involves configuring the POS module 110 itself, e.g., by dictating one or more transaction flows to be used by the POS transaction module 130. The set-up operation may also involve configuring one or more add-in modules 112. The add-in modules 112 that are being configured may themselves contribute to the configuration process. For example, the add-in modules 112 may invoke their own user interface (UI) pages to interact with the user during the set-up process.

The POS module 110 can also include a POS settlement module 136. The POS settlement module 136 can perform settlement with respect to one or more transactions that have been performed by the POS transaction module 130. For example, the POS settlement module 136 can perform settlement at fixed intervals of time (e.g., at the end of each day) based on transactions that have occurred within that interval. Alternatively, or in addition, settlement can occur generally at the time that one or more transactions are authorized. Settlement represents the consummation of a transaction, which may involve the transfer of funds between accounts, and so on. The POS settlement module 136 can operate on batches of transactions of predetermined maximum size. The settlement module 136 can store details regarding these transactions in a transaction store 138. As in the case of the POS configuration module 132, the POS settlement module 136 can perform its functions in cooperation with settlement functionality provided by one or more add-in modules 112 (to be described below). Alternatively, or in addition, a relevant add-in module can also store transaction details for later settlement.

Figure 2:
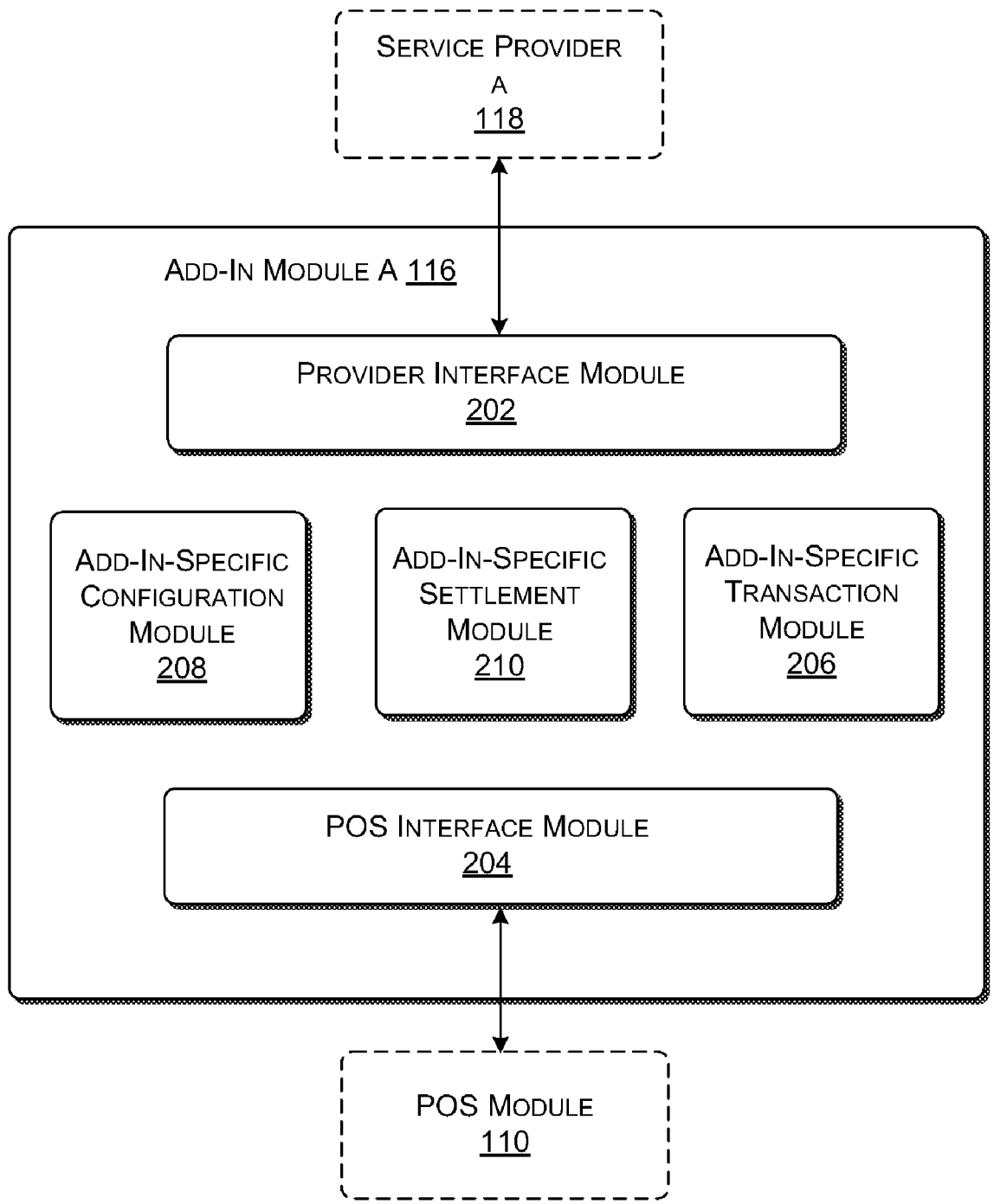
FIG. 2 shows an illustrative add-in module for use in the system of FIG. 1.

FIG. 2 shows additional details regarding the representative add-in module A 116. Other add-in modules (e.g., 120, . . . 124) may have a similar construction to that shown in FIG. 2 or a different construction.

As indicated in the contextual setting of FIG. 1, the add-in module A 116 interacts with the service provider A 118. The add-in module A 116 in cooperation with the service provider A 118 can provide a particular method of check processing, such as the electronic transaction method, the verification method, or some other method. The add-in module A 116 also interacts with POS module 110, which provides base functionality for performing transactions using multiple different workflows.

The add-in module A 116 includes a provider interface module 202 for interacting with the service provider A 118. The provider interface module 202 can use any kind of protocol for communicating with the service provider A 118, e.g., as dictated by the service provider A 118. In one case, for instance, the provider interface module 202 communicates with the service provider A 118 over a wide area network (e.g., the Internet), using, for example, a web services protocol. The add-in module A 116 also include a POS interface module 204 for communicating with the POS module 110. The POS interface module 204 communicates with the POS module 110 based on the general protocol specified by the POS-to-add-in interface module 128 (shown in FIG. 1).

The add-in module A 116 includes a number of component modules which complement the component modules of the POS module 110. For instance, the add-in module A 116 can include an add-in-specific transaction module 206. The add-in-specific transaction module 206 performs specific processing associated with a selected method of check payment. For instance, in the case of the electronic transaction method, the add-in-specific transaction module 206 can interact with the user through one or more appropriate user interface pages to request specific information, such as driver's license number, if that information is used in that specific method of check payment. Further, the add-in specific transaction module 106 can interact with the service provider A 118 to determine whether the customer is approved for an electronic transaction method of check payment. The add-in-specific transaction module 206 can communicate an authorization response to the POS transaction module 130.

The add-in module A 116 also includes an add-in-specific configuration module 208. This module 208 performs specialized configuration of the add-in module A 116 in cooperation with the POS configuration module 132. In so doing, the add-in-specific configuration module 208 may launch its own UI pages.

The add-in module A 116 also includes an add-in-specific settlement module 210. The add-in-specific settlement module 210 performs specific settlement processing associated with a particular method of check processing. The add-in-specific settlement module 206 works in conjunction with the POS settlement module 136.

Figure 3:
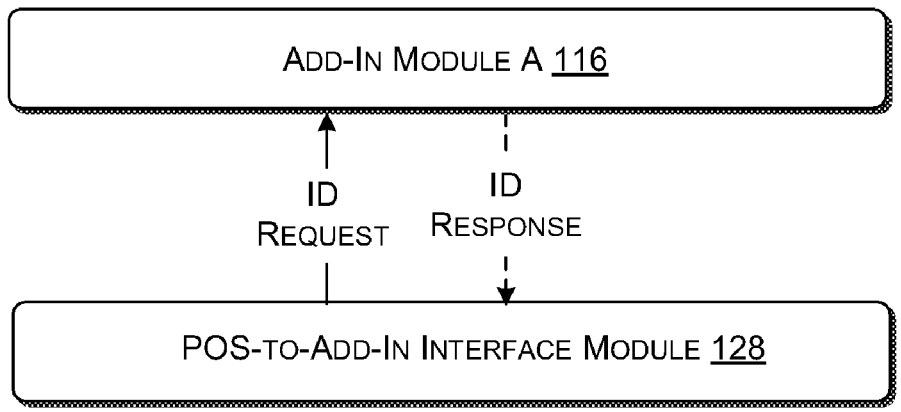
FIG. 3 shows an illustrative message exchange between a POS-to-add-in interface module and an add-in module; this message exchange is used for determining identification data associated with the add-in module.
Figure 4:
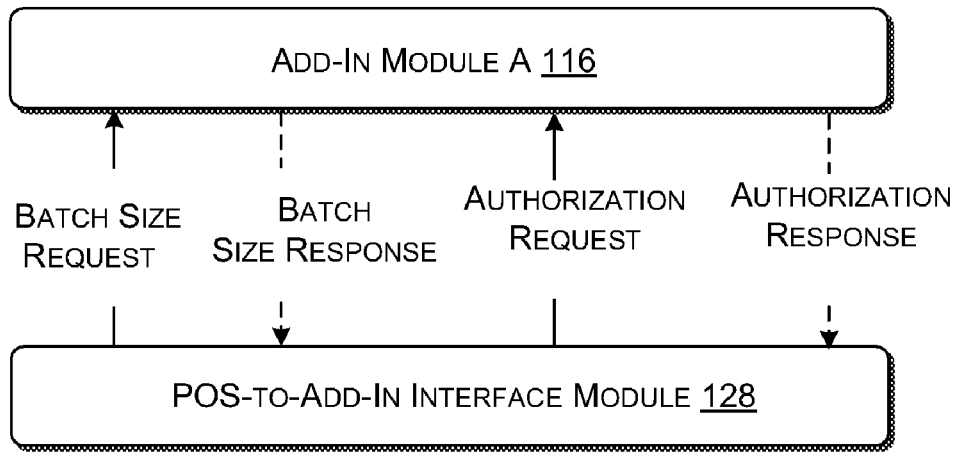
FIG. 4 shows another illustrative message exchange for determining a maximum batch size associated with an add-in module, followed by another message exchange for determining whether a check transaction is approved or denied.
Figure 5:
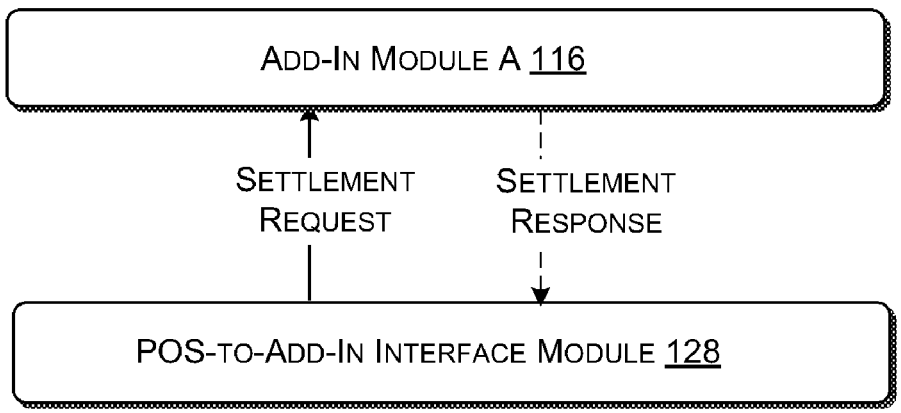
FIG. 5 shows another illustrative message exchange that forwards settlement data to the add-in module, enabling the add-in module to perform settlement of one or more transactions.

FIGS. 3-5 show various message exchanges between the representative add-in module A 116 and the POS-to-add-in interface module 128. Together these messages exchanges define one illustrative protocol that may be specified by the POS-to-add-in interface module 128. Accordingly, any new service provider is asked to provide an add-in module which conforms to the appropriate protocol. Note that the particular series of message exchanges shown in FIGS. 3-5 is merely representative. Other implementations can use a collection of message exchanges that differ from the details shown in FIGS. 3-5 in any respect.

Starting with FIG. 3, this figure shows an ID inquiry message exchange that is used for soliciting identification data from the add-in module A 116. This message exchange includes an identification request sent from the POS module 110 to the add-in module A 116, followed by an identification response from the add-in module A 116 to the POS module 110. The identification data provided in the response may comprises a global unique identifier (i.e., a GUID) associated with the add-in module A 116, or some other type of identification information. The POS module 110 uses this identification data to uniquely identify the add-in module A 116, allowing the POS module 110, for instance, to enumerate the available add-in modules 112 to the user during a set-up stage of operation. The details described here pertain only to one illustrative protocol; other protocols may differ in any respect from the details provided here.

FIG. 4 shows an authorization message exchange which occurs in the course of a transaction. This message exchange includes an authorization request message sent by the POS module 110 to the add-in module A 116, followed by an authorization response from the add-in module A 116 to the POS module 110. In one illustrative and non-limiting example for the electronic transaction method of payment, the authorization request can include various details associated with a transaction. For example, the authorization request can include transaction reference information, various details automatically and/or manually read from the check (account number, check number, etc.), amount information (regarding the monetary amount of the transaction), and so on. The authorization response can include information regarding whether the service provider A 118 has approved or denied the transaction. For example, the approval information can include binary YES/NO-type information, an approval code associated with the authorization decision, and so on. The authorization response can also include settlement information regarding the transaction that allows the POS module 110 to later settle the transaction. The authorization response can also specify the text of a message to be conveyed to the customer, such as text to be printed on a receipt given to the customer. Again, the details described here pertain only to one illustrative protocol; other protocols may differ in any respect from the details provided here.

An authorization message may be preceded (or followed) by a batch size message exchange. This message exchange solicits batch size information from the add-in module A 116, identifying the maximum batch size used by the add-in module A 116 to settle transactions. The batch size message exchange includes a batch seize request sent from the POS module 110 to the add-in module A 116, followed by a batch size response sent from the add-in module A 116 to the POS module 110. The batch size response identifies the maximum batch size used by the add-in module A 116.

FIG. 5 shows a settlement message exchange which may occur at any time following authorization. In one case, for instance, the settlement message exchange can occur at regular intervals, e.g., at the end of each business day. The settlement message exchange includes a settlement request message sent by the POS module 110 to the add-in module A 116, followed by a settlement response from the add-in module A 116 to the POS module 110. In one illustrative example, the settlement request message can include information regarding a batch of transactions that have been stored in the transaction store 138. The maximum size of the batch is the size which has been previously conveyed by the batch size message exchange (of FIG. 4). Upon receipt of the settlement information, the add-in-specific settlement module 210 (of FIG. 2) performs settlement in cooperation with the service provider A 118. The settlement response can include an indication whether the settlement operation was successful, and if not successful, why it was not successful. Again, the details described here pertain only to one illustrative protocol; other protocols may differ in any respect from the details provided here. For example, in one case, the settlement operation and the authorization operation can take place as an integrated operation at the time of sale or other juncture.

Figure 6:
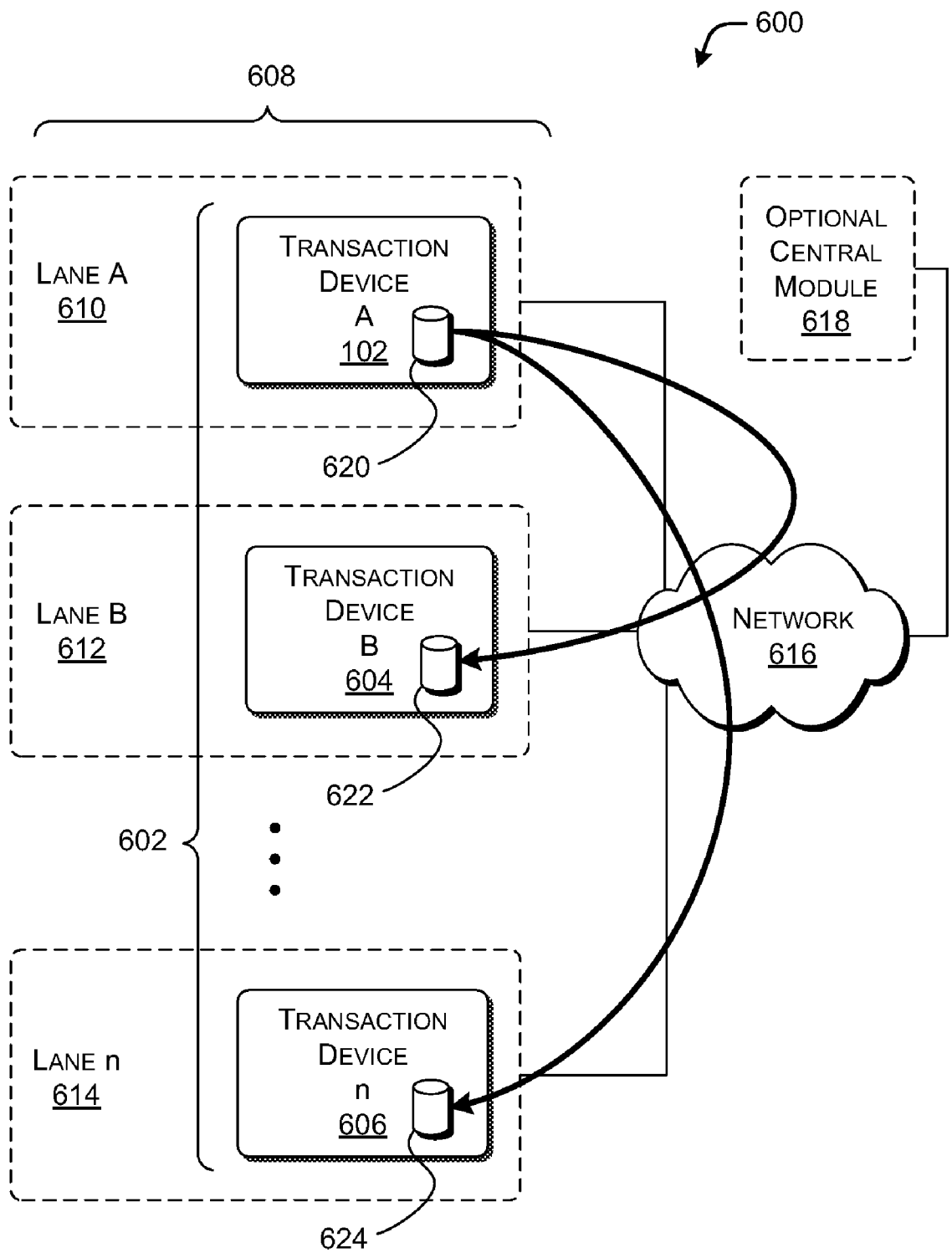
FIG. 6 shows an illustrative system that includes plural transaction devices, particularly showing how one transaction device may disseminate configuration information to other transaction devices.

FIG. 6 shows a system 600 that includes a plurality of transaction devices 602. The plurality of transaction devices 602 can include the above-described transaction device A 102, transaction device B 604, transaction device n 606, etc. In a retail business setting, the transaction devices 602 may be provided within respective checkout lanes 608. For example, transaction device A 102 may be provided in lane A 610, transaction device B 604 may be provided in lane B 612, transaction device n 606 may be provided in lane n 614, and so on.

Any kind of network 616 may be used to communicatively connect the transaction devices 602. The network 616, for instance, can comprise a point-to-point connection mechanism, a local-area-network (LAN) of any type, a wide-area-network (WAN) of any type, and so on. The network 616 can be physically implemented using any combination of hard-wired links, wireless links, name servers, gateways, routers, and so on (not shown). The network 616 can be governed by any protocol or combination of protocols.

In one case, the transaction devices 602 can communicate with each other without a separate coordinating module. In this case, one of the transaction devices 602 can be selected to serve a host function, thereby coordinating the communication among the transaction devices 602. In another case, the system 600 can include one or more central modules 618. For example, the central module 618 can be implemented by a server-type computer that is provided in a manager's office of the business or at some other administrative location.

FIG. 6 illustrates the manner in which configuration information can be disseminated among the transaction devices 602. In one case, a set-up operation is performed by a user on one of the transaction devices 602, such as transaction device A 102. The result of the set-up operation is configuration information. The transaction device A 102 can store the configuration information in a local configuration store 620, which may be provided by the POS module 110, or by the relevant add-in module(s) 112, and so on. At this point, the transaction device A 102 can directly transfer the configuration information to other transactions devices (604, ... 606) via the network 616. Transaction device B 604 stores the configuration information in a local configuration store 622, while transaction device n 606 stores the configuration information in a local configuration store 624. Alternatively, the central module 618 can play a role in distributing the configuration information from the transaction device A 102 to the other transaction devices (604, ... 606). Alternatively, the set-up operation can be performed by the central module 618 and the configuration information can be transferred to (or referenced by) each of the transaction devices 602. Still other strategies for configuring the transaction devices 602 can be used.

FIGS. 7-12 show various user interface (UI) presentations that can be presented by the transaction functionality 108 in the course of configuring the transaction device 102 or in the course of performing a transaction using the transaction device 102. FIG. 13 shows an illustrative receipt that can be printed by the transaction functionality 108 in the course of performing a transaction by the transaction device 102. This section (Section A) ends by introducing each of these figures (FIGS. 7-13). A more detailed description of each of these figures will be provided in the next section (Section B).

Figure 7:
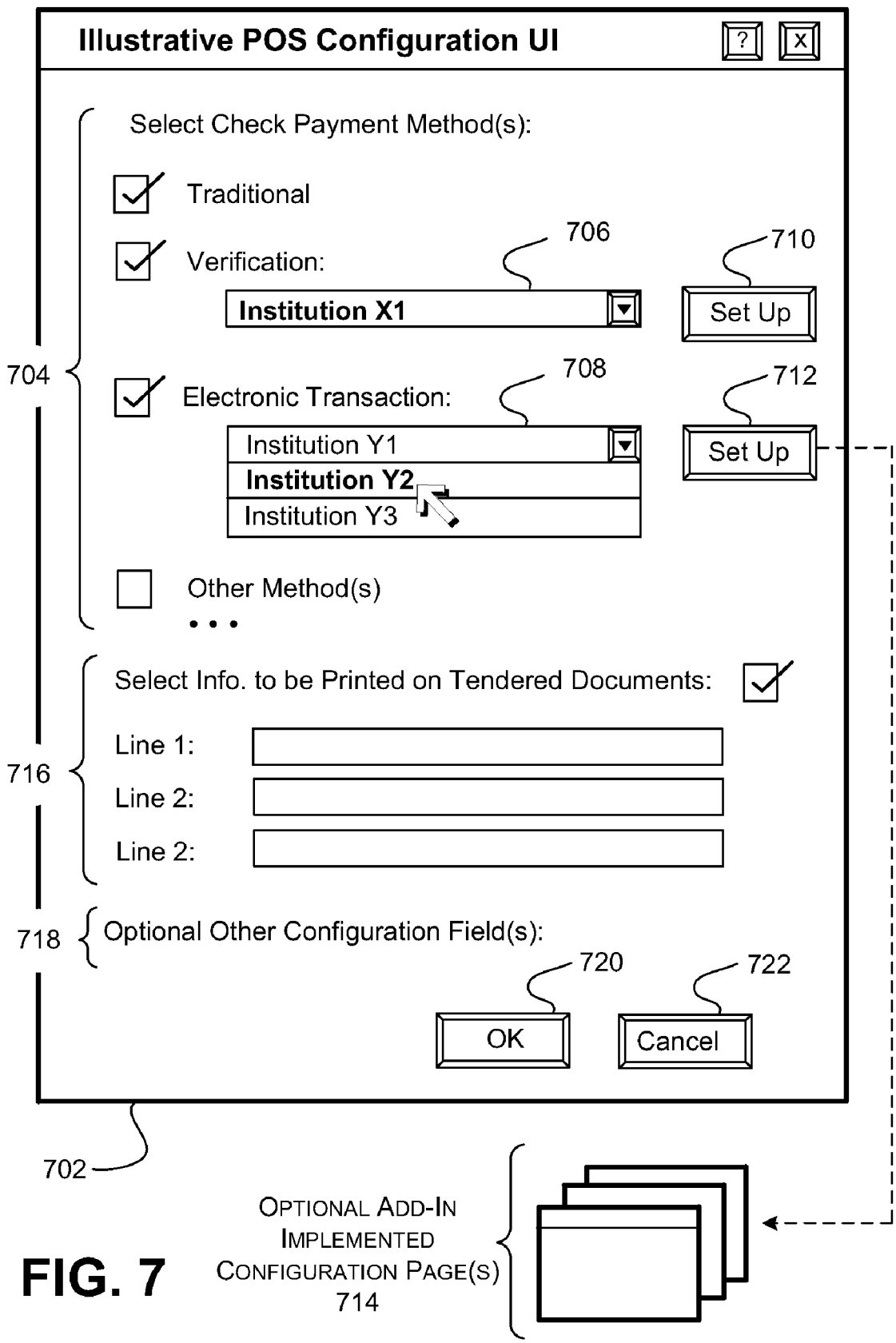
FIG. 7 shows an illustrative user interface (UI) page used to configure the POS module and one or more add-in modules.

FIG. 7 shows an illustrative user interface (UI) page 702 used to configure the POS module 110 and one or more add-in modules 112.

Figure 8:
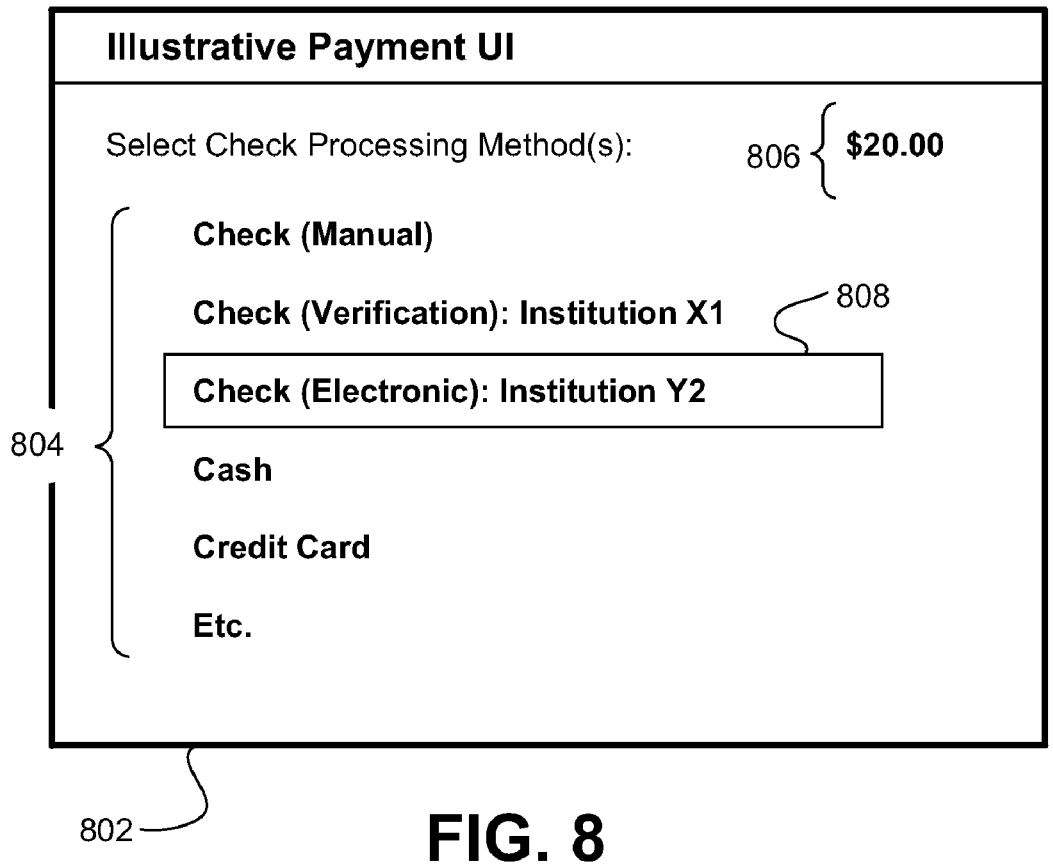
FIG. 8 shows an illustrative UI page presented at the time of a transaction, which invites a user to select a desired method of payment.

FIG. 8 shows an illustrative UI page 802 presented at the time of transaction, which invites a user to select a desired mode of payment.

Figure 9:
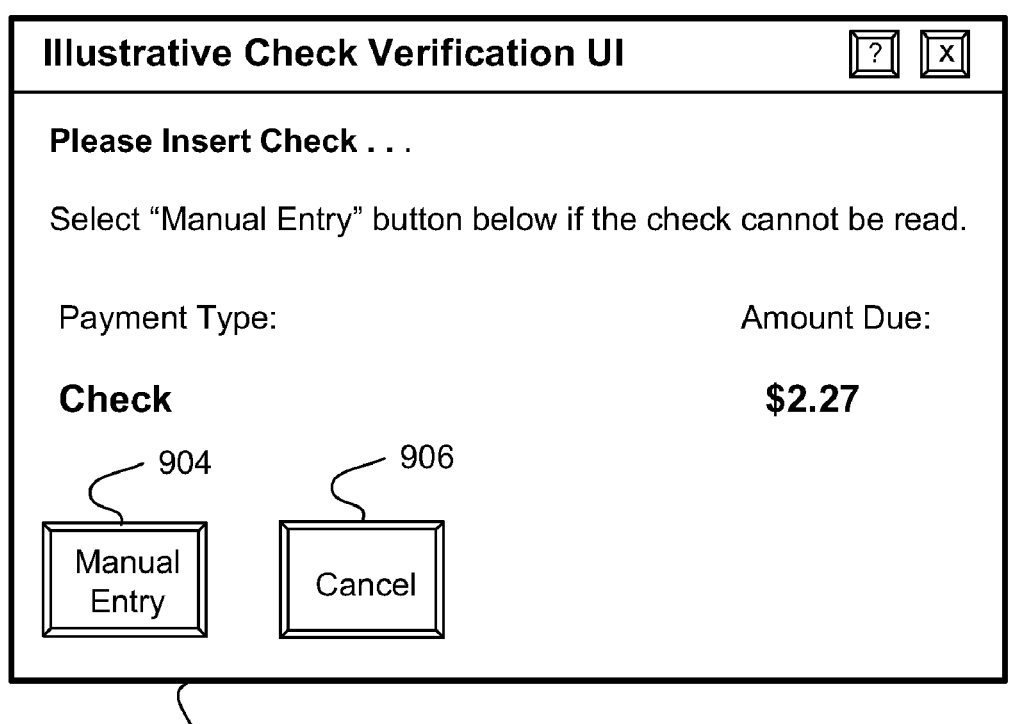
FIG. 9 shows an illustrative UI page that instructs the user to use a check reader device to read information from a check.

FIG. 9 shows an illustrative UI page 902 that instructs the user to use a check reader device to read check information from a check.

Figure 10:
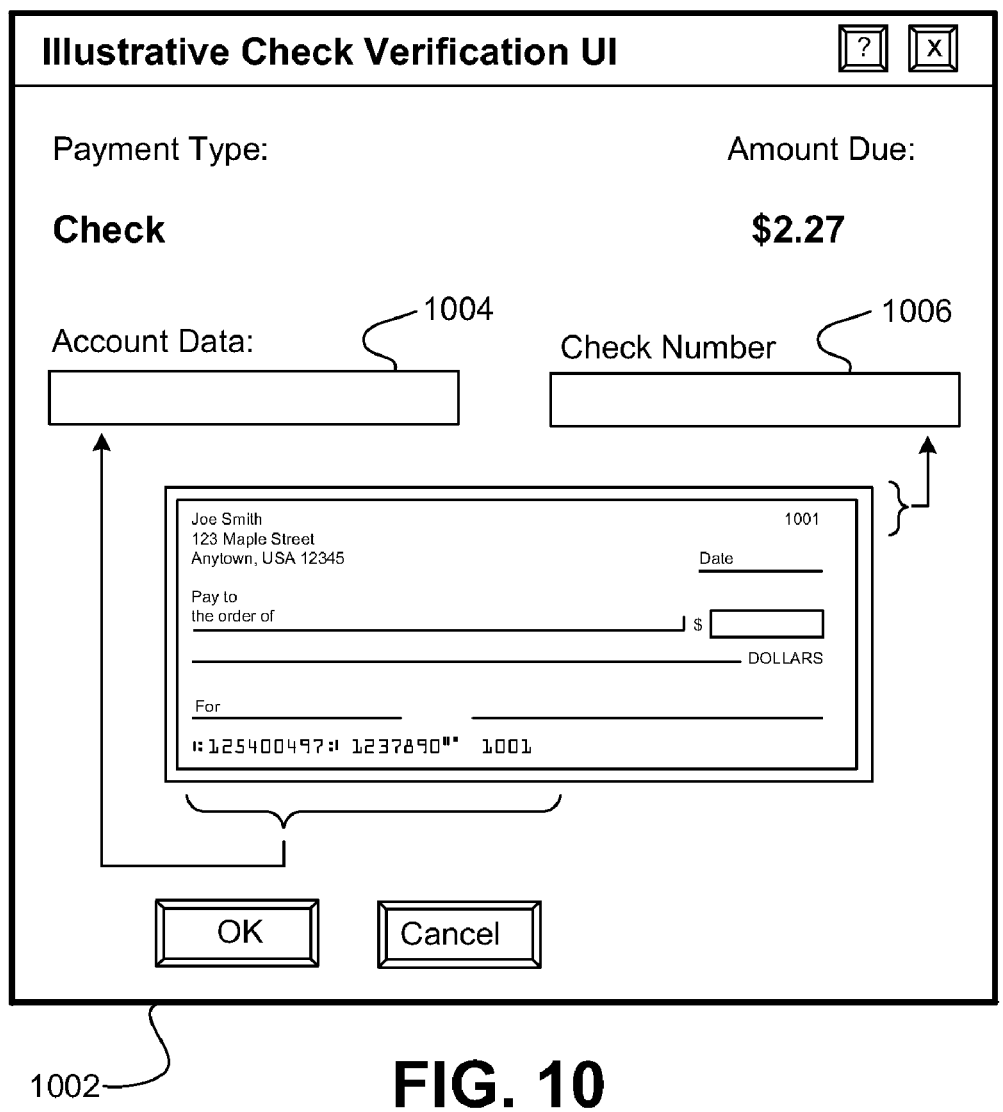
FIG. 10 shows an illustrative UI page that allows the user to manually input information regarding the check.

FIG. 10 shows an illustrative UI page 1002 that allows the user to manually input information regarding the check.

Figure 11:
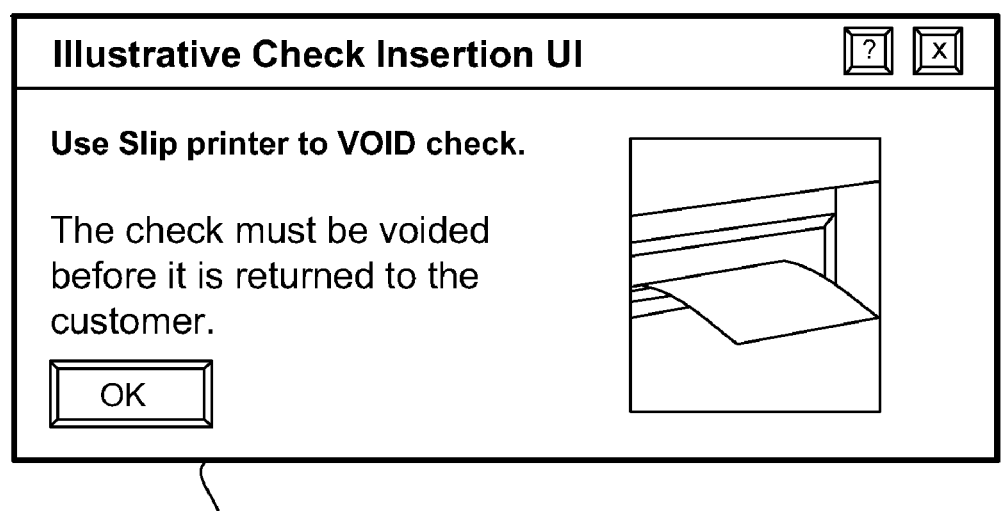
FIG. 11 shows an illustrative UI page that instructs the user to use a slip printer to void a check (because, in one scenario, the check has been converted to an electronic transaction).

FIG. 11 shows an illustrative UI page 1102 that instructs the user to use a slip printer to void a check (because, in one scenario, the check has been converted to an electronic transaction).

Figures 12, 13:
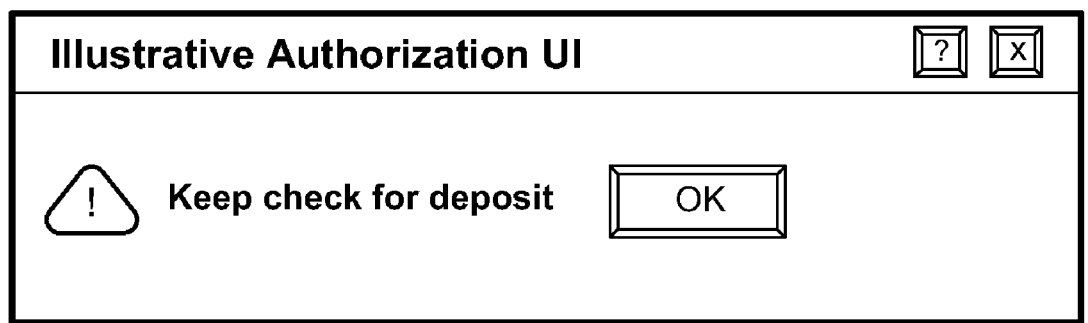
FIG. 12 shows an illustrative UI page that instructs the user to retain a check for later manual deposit.
FIG. 13 shows an illustrative receipt that can be printed by the POS-module.

FIG. 12 shows an illustrative UI page 1202 that instructs the user to retain a check for later manual deposit.

FIG. 13 shows an illustrative receipt 1302 that can be printed by the POS-module 110.

B. Illustrative Flowcharts

FIGS. 14-20 illustrate the operation of the system 100 of FIG. 1 (or other type of system) in flowchart form. To facilitate discussion, certain operations are described in FIGS. 14-20 as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from the order employed in the examples set forth in this disclosure. The blocks shown in the flowcharts can be implemented by software, firmware, hardware, manual processing, any combination of these implementations, and so on.

Figure 14:
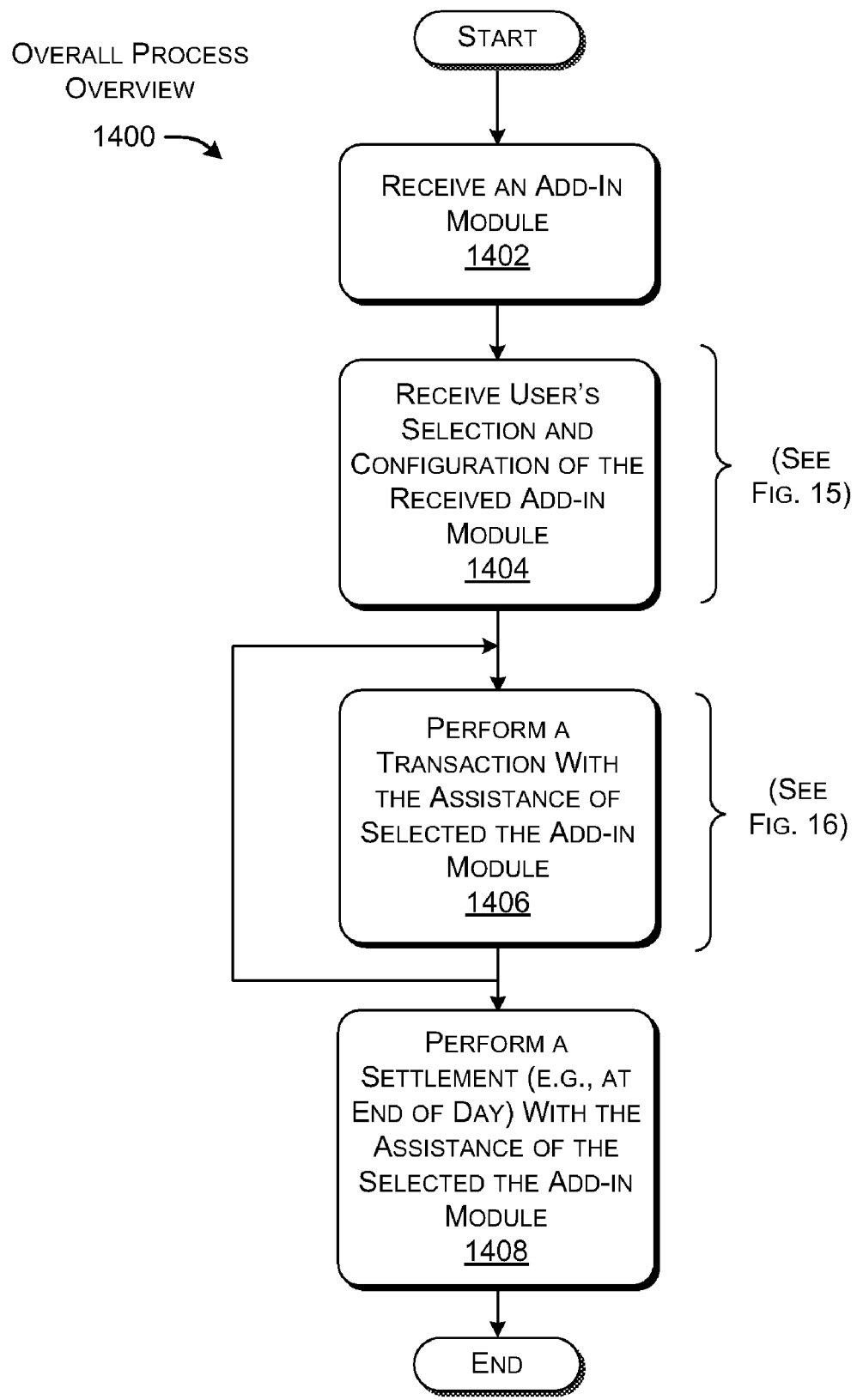
FIG. 14 is a flowchart that presents an overview of how add-modules can be used in a business that accepts checks as a mode of payment.

Starting with FIG. 14, this figure shows an overview procedure 1400 that encompasses setting up the system 100, performing one or more transactions using the system 100, and settling one or more transactions using the system 100. To make the discussion more concrete (but at the same time, illustrative and non-limiting), the procedure 1400 will be described in the context of the interaction between the POS module 110 and the representative add-in module A 116 (and associated service provider A 118). The operations described in FIG. 14 can be extended to the case where other add-in modules are used or any combination of add-in modules is used.

Block 1402 entails receiving the add-in module A 116 from the service provider A 118. The service provider A 118 designs the add-in module A 116 to conform to the protocol specified by the POS-to-add-in interface module 128. Other add-in modules can be received from other respective service providers.

Block 1404 corresponds to a set-up operation that is described in greater detail below in the context of FIG. 15. By way of overview, the set-up operation entails presenting configuration options to the user and receiving the user's selection from among these options. The set-up operation in block 1404 may specifically entail receiving the user's selection of one or more workflows to be used to process check transactions (where the workflows, in turn, may be associated with one or more corresponding add-in modules). The set-up operation may also entail receiving the user's configuration of one or more of the selected add-in modules.

Figure 16:
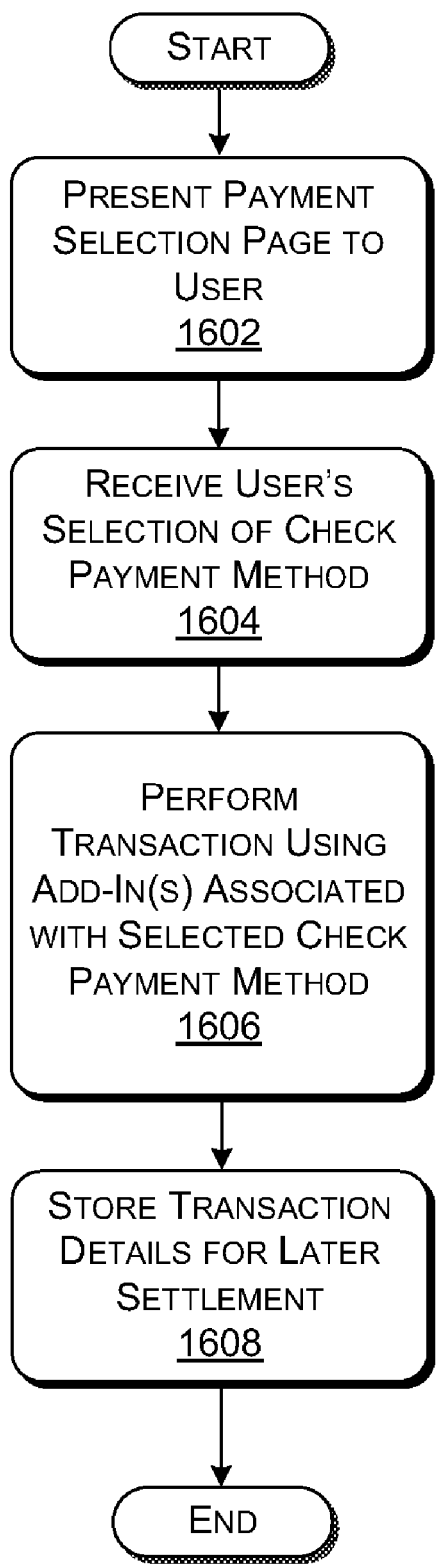
FIG. 16 is a flowchart that shows an illustrative method for performing a transaction using a POS module and one or more add-in modules.

Block 1406 corresponds to a transaction operation that is described in greater detail in the context of FIG. 16. By way of overview, the transaction operation may involve collecting transaction data (e.g., data regarding the customer's check, data regarding the transaction amount, etc.), submitting the collected data to the add-in module A 116 for authorization, receiving an authorization response from the add-in module A 116, printing various receipts, voiding the customer's check (if the electronic transaction method is used), and so forth.

Block 1408 corresponds to a settlement operation that is performed to settle one or more transactions performed in block 1406. The settlement operation can be performed at regular intervals of time, such as at the end of every day. The settlement operation can proceed in bundles of transactions having a prescribed batch size specified by the add-in module A 116. The settlement operation itself is performed by the POS module 110 in conjunction with the add-in module A 116. Namely, when called by the POS module 110, the add-in module A 116 performs settlement operations that are specific to a particular type of check payment method. In another implementation, the settlement operation can take place generally at the same time as the authorization operation.

Figure 15:
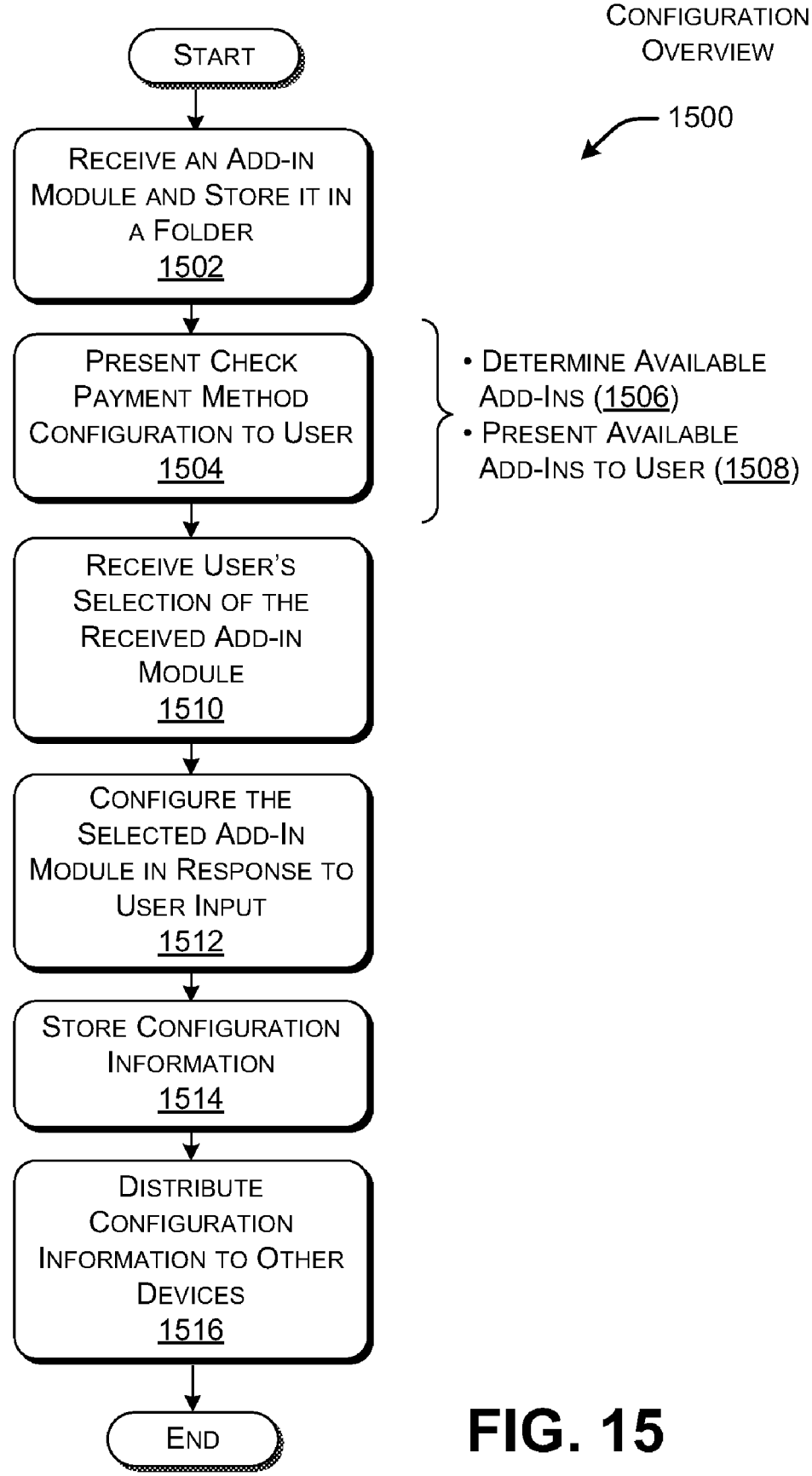
FIG. 15 is a flowchart that shows an illustrative method for configuring a POS module and one or more add-in modules.

FIG. 15 is a procedure 1500 that provides additional details regarding the configuration of the transaction functionality 108. In one case, the procedure 1500 can invoke one or more configuration user interface (UI) pages, such as the configuration page 702 shown in FIG. 7. Thus, the procedure 1500 of FIG. 15 will be described in parallel with the configuration page 702 of FIG. 7.

Block 1502 involves receiving one or more add-in modules 112 from one or more respective service providers 114. The add-in modules 112 can be stored in a prescribed location, such as the folder 134 shown in FIG. 1.

Block 1504 ("present check payment method configuration to user") entails presenting the configuration page 702 (or some other configuration page) to the user to allow the user to configure the transaction functionality 108. Block 1504 may include an operation 1506 of determining the add-ins modules 112 that are available for use. Operation 1506 can perform this task by using the ID inquiry message exchange (see FIG. 3) to identify the GUIDs of the available add-in modules stored in the folder 134. Block 1504 may then include an operation 1508 of presenting workflow choices to a user. One or more workflow choices may be associated with one or more respective add-in modules 112 (that were determined to be available in operation 1506). The configuration page 702 invites the user to select one or more workflow options and associated add-in modules 112.

More specifically, as shown in FIG. 7, the configuration page 702 includes a portion 704 which enumerates different transaction workflows that can be used to process a customer check. One method is the traditional (manual) method. In this method, the user (e.g., cashier) may optionally request the customer to present one or more forms of ID to ensure that the customer is who she claims to be and to provide contact information in case that check is later dishonored (at which time the customer may be charged a prescribed fee). This method does not make use of a complementary add-in module. Another method is the verification method (described above). Another method is the electronic transaction method (described above). The portion 704 provides three choices as enumerated above, but can include more than three choice or fewer than three choices. A user can select any one or more of these choices, e.g., by placing a mark in check boxes associated with the choices. Selecting a workflow choice means that this workflow will be an available option for payment at the time of transaction.

As indicated in FIG. 7, the verification method may entail the use of an add-in module (however, in other cases, the verification method may not involve the use of an add-in module). Assume, in the illustrative case of FIG. 7, that more than one add-in module exists to perform the verification method, e.g., a first add-in module provided by institution X1, a second add-in module provided by institution X2, and so on. A drop-down menu 706 (or other selection mechanism) can be used to select the add-in module that the business wishes to use to perform the verification method; in this case, the user has selected the add-in module provided by institution X1.

Similarity, the electronic transaction method may entail the use of an add-in module. Assume that more than one add-in module exists to perform the electronic transaction method, e.g., a first add-in module provided by institution Y1, a second add-in module provided by institution Y2, and so on. A drop-down menu 708 (or other selection mechanism) can be used to select the add-in module that is to be used to perform the electronic transaction method; in this case, the user is in the process of selecting the add-in module provided by institution Y2.

Block 1510 entails receiving the user's selections described above. Namely, in the case shown in FIG. 7, the use has specified that check processing can use any one of the traditional method, the verification method, and the electronic transaction method. The user has selected that that the verification method is to use the add-in module provided by institution X1, while the electronic transaction method is to use the add-in module provided by institution Y2. The user (e.g., on behalf of the business) can make these selections based on any criterion or combination of criteria. For example, a business may want to select an institution that offers the lowest service fees, or the institution that provides the most useful features, or the institution that provides the most reliable service, and so on, or any combination of such factors.

Block 1512 entails configuring the individual add-in modules that have been selected as per block 1510. This operation can be invoked for the verification method by clicking on a set-up command button 710 adjacent to the verification option. This operation can be invoked for the electronic transaction method by clicking on a set-up command button 712 adjacent to the electronic transaction option. Consider in further detail the case in which the user clicks on the set-up button 712. This action will prompt the presentation of one or more additional UI pages 714. The additional UI pages 714 may solicit institution-specific information appropriate to the electronic transaction method provided by institution Y2. For example, these pages 714 may ask the user to input bank account information associated with the business, subscription ID information associated with the business, and so on. In one case, the add-in module that is being configured can invoke the additional configuration pages 714.

FIG. 7 illustrates that the configuration operation may collect additional configuration information from the user. In portion 716, for instance, the configuration page 702 asks the user to input the text that will be printed on tendered checks. Portion 718 generically represents any additional configuration information that may be collected from the user.

Finally, the configuration page 702 includes an OK command button 720 to save all the entered configuration information, and a cancel command button 722 to abort the set-up operation without saving the configuration information.

Returning to FIG. 15, in block 1514, if the user activates the OK command button 720, the POS configuration module 132 stores the configuration information in its configuration store 620 (see FIG. 6).

Block 1516 optionally entails disseminating the configuration information from transaction device A 102 to other transaction devices in the system (as was described in the context of FIG. 6).

FIG. 16 is a procedure 1600 that provides additional details regarding the one illustrative manner of performing a transaction. This procedure 1600 takes place after the set-up procedure 1500 of FIG. 15 has been completed, e.g., at the time that a customer presents a check as a form of payment.

Block 1602 entails presenting a payment selection page to the user (e.g., the cashier). FIG. 8 shows one such payment selection page 802. The payment selection page 802 provides a list of illustrative and non-limiting payment options in portion 804. In this portion 804, the user is invited to specify whether payment is to be handled using the traditional check processing method, the verification check processing method, or the electronic transaction check processing method. The options may also invite the user to select one or more non-check modes of payment, such as cash payment, credit card payment, debit card payment, voucher payment, and so on. The payment selection page 802 may optionally display the amount of the transaction in portion 806.

Block 1604 entails receiving the user's selection of a payment method. In the merely illustrative case of FIG. 8, the user has selected the electronic transaction method of payment (as is indicated by the highlighted option 808), which involves converting a paper check into an electronic transaction. Each payment method is associated with a different transaction workflow. Hence, by selecting a payment method, the user implicitly invokes a transaction workflow to be used by the transaction functionality 108.

Block 1606 entails performing the transaction using the selected payment method and associated transaction workflow. Depending on the selection, the transaction may involve interaction between the POS module 110 and one or more add-in modules. The transaction, for instance, may call on the add-in module A 116 to authorize an electronic transaction payment in cooperation with the service provider A 118. The add-in module A 116 sends an authorization response back to the POS module 110 which indicates whether or not the transaction has been approved.

If a transaction is not approved using the selected check payment processing method, the POS module 110 may revert to handling the check payment using a different check payment processing method. For example, if the check cannot be processed as an electronic payment, the POS module 110 may attempt to process the check using the check verification method (using an add-in configured for check verification). Or the POS module 110 may attempt to process the check using traditional check processing. The selection of a new check payment processing method can be performed manually by asking the user to explicitly select a different method of processing the check payment. In addition, or alternatively, the POS module 110 can automatically invoke the new check payment processing method. If the new check payment processing method is automatically selected by the POS module 110, the POS module 110 may inform the user accordingly through an appropriate user interface presentation.

Block 1608 entails storing details of the transaction for later settlement. Various reports may also be compiled based on stored transaction information.

To repeat, the above-described procedure 1600 is representative; other procedure flows are possible. In another case, for instance, the transaction flow that is selected can depend on one or more factors. For example, the POS module 110 can adopt a first check payment processing method if a transaction amount is above a defined threshold, and a second check payment processing method if the transaction amount is equal to or below the defined threshold.

Figure 17:
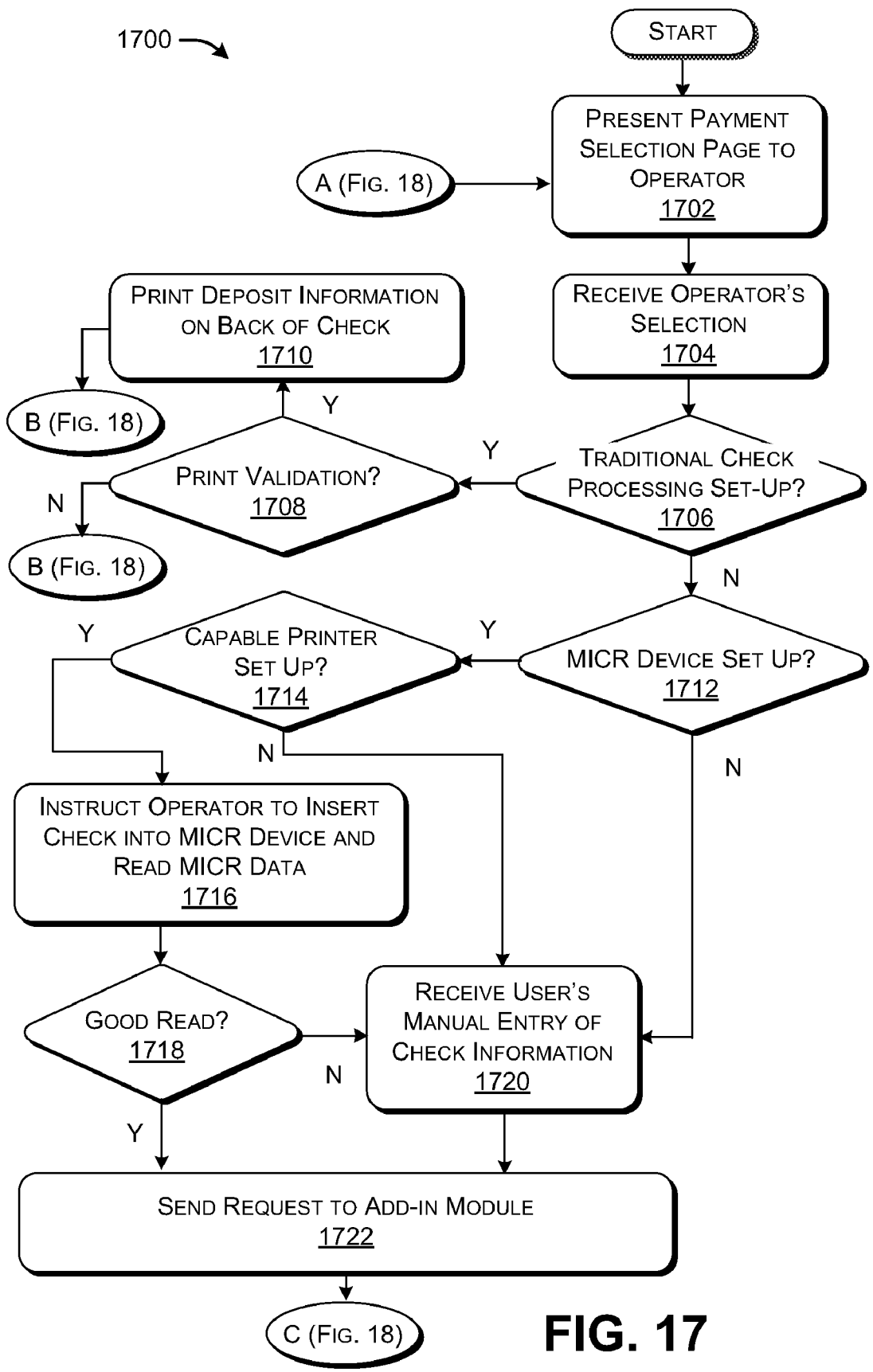
FIGS. 17-19 together provide a flowchart that shows a more specific illustrative method for performing a transaction using a POS module and one or more add-in modules.
Figure 18:
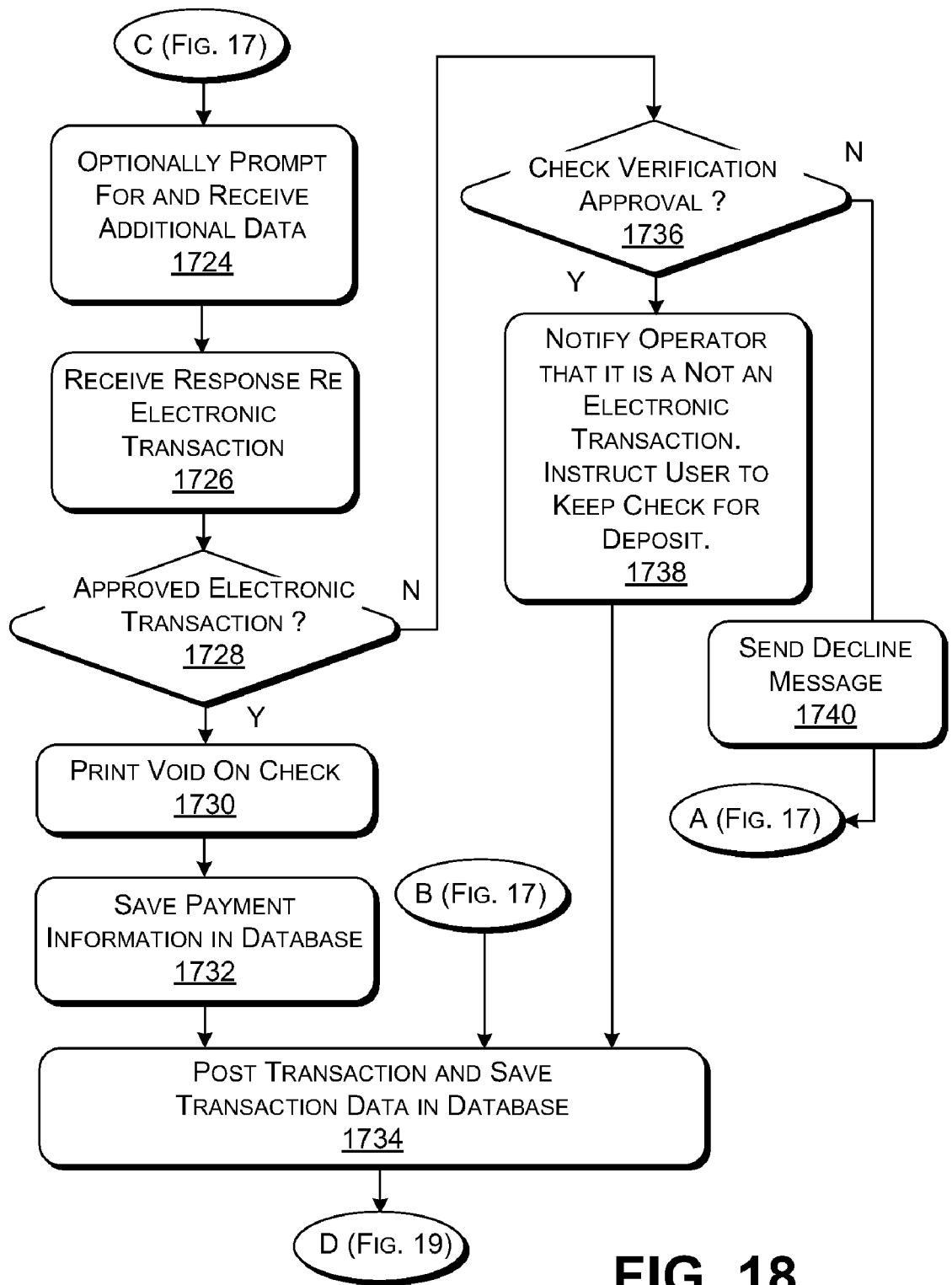
Figure 19:
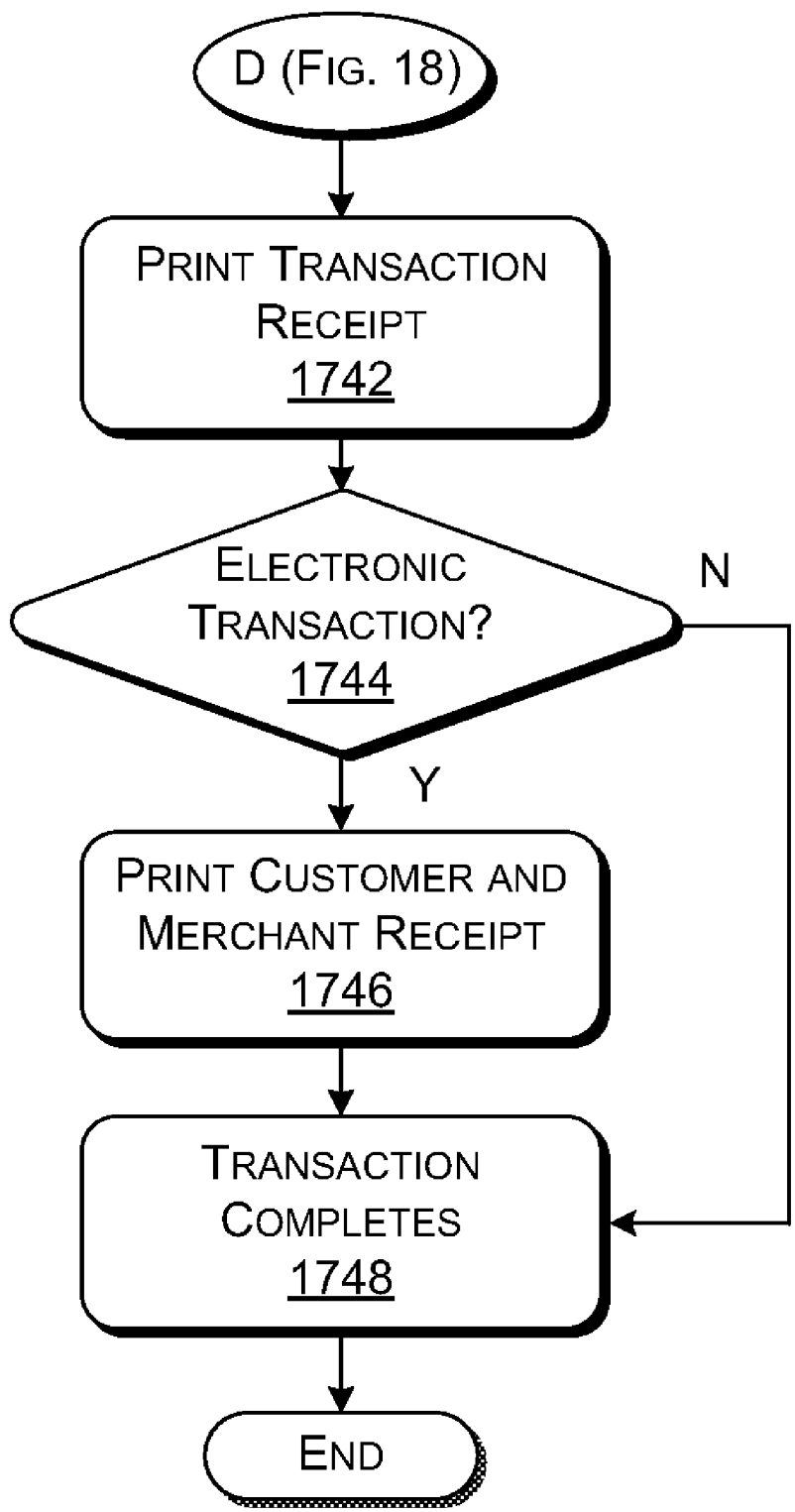

FIGS. 17-19 together comprise a single procedure 1700 that describes a more detailed way of performing a transaction using the above-described add-in approach. In this example, the verification method may be conditionally invoked upon the failure of the electronic transaction method. But this is merely one of many examples. In another case, the POS module 110 can, at the outset, invite the user to select any of the traditional method, the verification method, or the electronic transaction method, etc.

Beginning with FIG. 17, block 1702 entails presenting the payment selection page to the user. This process was described in the context of FIG. 16. FIG. 8 shows one such illustrative payment selection page 802.

Block 1704 entails receiving the user's selection of a payment method. In the case of FIG. 8, the user has selected the electronic transaction method of payment.

Block 1706 determines whether the user has selected the tradition mode of payment. If so, block 1708 is invoked, which determines whether a print validation protocol is to be followed. If this block (1708) is answered in the affirmative, then block 1710 is invoked, which involves printing deposit information on the back of the check.

Assuming that traditional check processing has not been selected (as per block 1706), the flow proceeds to block 1712, in which it is determined whether the magnetic ink character recognition (MICR) device is set up and ready to use. If so, the flow proceeds to block 1714, in which it is determined whether a printer is set up and ready to use (e.g., for printing receipts, etc.).

If block 1714 is answered in the affirmative, the flow proceeds to block 1716, where the user is invited to insert the check into the MICR device so that check information can be read from the check. FIG. 9 shows an illustrative UI page 902 that can be used to convey this instruction to the user. The UI page 902 gives the user the option to alternatively enter the check information via a manual method (e.g., by clicking on the "Manual Entry" command button 904). A cancel command button 906 may return the user back to the payment selection page (e.g., page 802 of FIG. 8). The check information that is read from the check can include account data and transaction data (which is information that is printed at the bottom of the check).

Block 1718 determines whether the MICR reader is successful in reading the information from the check. If the MICR reader cannot recognize all the characters, the transaction device 102 may ask the user to retry the reading operation.

Block 1720 entails the manual entry of check information. This block is invoked if the MICR device or printer is not setup and ready or if the MICR device is not able to successfully read the check information. FIG. 10 shows one illustrative UI page 1002 that can be used to solicit check information from the user in a manual manner. Portion 1004 allows the user to input account data from the check. Portion 1006 allows the user to enter check number data from the check.

Block 1722 entails commencing the authorization process for the electronic transaction method of payment. As part of the this operation, the POS transaction module 130 can first verify that the add-in module A 116 is present and ready for use by making appropriate calls into the add-in module A 116 (e.g., using the POS-to-add-in interface module 128). Then, the POS transaction module 130 sends an authorization request to the add-in module A 116 using the POS-to-add-in interface module 128. The authorization message exchange was described in the context of FIG. 4. In this process, the POS transaction module 130 can send transaction information and check information to the add-in module A 116.

Continuing on to FIG. 18, block 1724 optionally entails prompting the user for additional information as part of the authorization process. The add-in module A 116 itself (rather than the POS transaction module 130) may optionally perform this function. That is, the add-in module A 116 itself may deliver one or more additional UI pages that solicit information from the user. In one case, an additional UI page may ask the user to check the customer's driver's license. In another case, an additional UI page may ask the user to explicitly approve an electronic transfer for the transaction, and so on.

At this point, the add-in module A 116 may forward all of the information that it has received to the service provider A 118. The service provider A 118 may answer the add-in module A 116 by indicating whether the transaction is approved or denied. In block 1726, if the transaction is approved, the add-in module A 116, in turn, sends an approval response back to the POS transaction module 130. The authorization response may indicate whether the transaction is approved together with an associated approval code. The authorization response may also include text to be printed on a receipt. The authorization response may also include settlement data to be used for later settlement of the transaction.

Block 1728 asks whether the electronic transaction has been approved. If so, block 1730 is performed; this operation entails printing void information on the check. FIG. 11 shows an illustrative UI page 1102 which instructs the user to insert the check for voiding. This printing operation ensures that the customer will not attempt to reuse the check and that the business will not attempt to manually deposit the check.

Block 1732 entails saving payment information in a database. This payment information indicates that payment has been approved (authorized), and that such payment is awaiting settlement.

Block 1734 entails posting the transaction and saving transaction data in the database. This action may entail informing the user that the transaction has been completed and storing data in the database regarding the transaction as a whole.

Returning to block 1728, assume that the add-in module A 116 denies the electronic transaction. In this case, the procedure 1700 attempts to authorize the check using the verification method. This conditional flow of operations is merely illustrative; other implementations may rely on a different flow of operations.

Block 1736 asks whether the verification method is available. If so, in block 1738, the POS transaction module 130, in optional cooperation with an appropriate add-in module, performs authorization using the verification method. As part of this method, the POS transaction module 130 can instruct the user to retain the check for manual deposit (since the check has not been converted to an electronic form). FIG. 12 shows an illustrative UI page 1202 for conveying this instruction to the user.

In block 1740, assuming that the check verification method is not available, the POS transaction module 130 sends a decline message to the user. The transaction flow can then return to the payment selection UI page (of block 1702), which invites the user to select another mode of payment.

Now advancing to FIG. 19, assume that the transaction has been posted, representing the successful outcome of the electronic transaction method or the verification method or the traditional method. Block 1742 then entails printing a transaction receipt for the customer, to memorialize the transaction for the customer. The transaction receipt may include the approval code (returned in the authorization response for the case of the electronic transaction method) along with the check number.

Block 1744 asks whether the transaction that has taken place corresponds to an electronic transaction method or some other payment method. If the electronic transaction method has been used, in block 1746, the POS transaction module 130 prints both a customer receipt and a merchant receipt. In one case, the customer receipt may be identical to the merchant receipt. The user may ask the customer to sign the merchant receipt, giving the business the authority to convert the check into an electronic transaction and automatically transfer funds from the customer's account to the business's account.

FIG. 13 shows a representative customer/merchant receipt 1302. This receipt 1302 includes various parts, such as: merchant information 1304 that identifies the business conducting the transaction; authorization information 1306 that explains the transaction and the nature of the authorization that the user is being asked to provide; transaction information 1308 that describes the details of the transaction; a signature block 1310 at which the customer is asked to supply her signature indicating her authorization of the transaction; customer information 1312 that identifies the customer; and any other information 1314 that a service provider and/or business may wish printed on the receipt 1302. In one implementation, the add-in module A 116 can specify the text to be printed on the receipt 1302. For example, the service provider A 118 can specify the text as a field in the authorization response that the add-in module A 116 sends to the POS transaction module 130. The POS transaction module 130 can journal all receipts that it prints, such as the transaction receipt, the customer receipt, and the merchant receipt.

Alternatively, if the electronic transaction is not approved, the POS transaction module 130 may print a denial receipt that indicates the denial of the transaction.

Block 1748 represents the termination of processing performed by the procedure 1700 of FIGS. 17-19.

Figure 20:
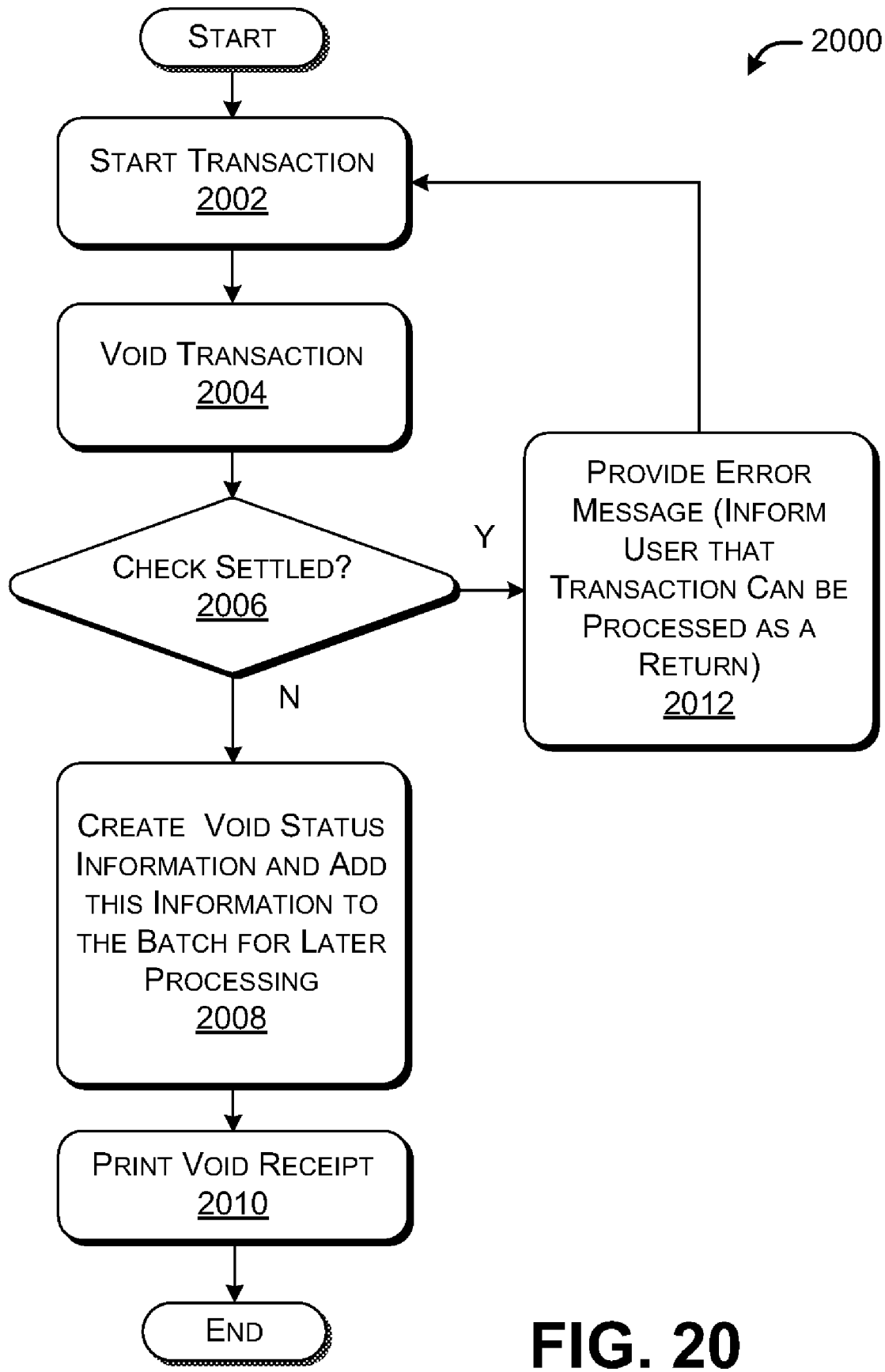
FIG. 20 is a flowchart that shows an illustrative method for voiding a transaction involving the use of a check.

FIG. 20 shows a procedure 2000 for voiding a transaction in the context of the electronic transaction method of check payment. Voiding a transaction is performed when, for any reason, the transaction is to be canceled after payment has been completed.

Block 2002 represents the start of a transaction.

Block 2004 represents an instruction or decision to void a transaction.

Block 2006 asks whether the transaction has settled or not.

Assuming that the transaction has not settled, as per block 2008, the POS transaction module 130 creates void status information and adds this void status information the settlement data. The void status information includes an instruction to void the transaction, together with enough detail to identify the transaction itself. The POS transaction module 130 sends the void status information to the add-in module A 116 at the time of settlement. The service provider A 118 processes the void status information by voiding the transaction in question.

Block 2010 indicates that the POS transaction module 130 may print a receipt for the customer to indicate that the transaction has been voided.

Returning to block 2006, assume next that the transaction has settled. If so, the funds may have already been transferred from the customer's account to the business's account. In this case, block 2012 may be invoked; in this operation, the transaction is voided by processing it as a return. That is, block 2012 entails creating a new transaction in which the business is presumed to have received back the purchased goods and provides a credit to the customer.

As another ancillary issue, printer failures may occur in the course of a transaction. In one case, an electronic transaction method of check payment cannot proceed if the following information cannot be printed: a transaction receipt; a customer receipt; a merchant receipt; and/or void information to be printed on the check. Accordingly, before processing commences, the POS transaction module 130 may ensure that the relevant printers are defined and ready for operation.

As another ancillary issue, the process flow may permit a split tender payment. A split tender payment occurs when the customer uses multiple forms of payment to complete a single transaction. For example, the customer may make a $100 purchase by splitting the payment into a $30 cash payment, a $50 credit card payment, and a $20 check payment.

The POS transaction module 130 may perform a split tender transaction in a hierarchy of operations. In one non-limiting case, the POS transaction module 130 processes credit card payments first, followed by check payments, followed by debit card and voucher payments, etc.

If a problem is discovered in the course of processing the check payment component of a split transaction, the POS transaction module 130 will change the status of the previous credit card authorization to void that payment; further, the overall transaction will not proceed. The check payment can be voided and the resultant void information can be stored in the relevant batch for processing at the time of settlement. The user (e.g., cashier) will then be presented with the payment selection UI page, inviting the customer to select another mode of payment if possible.

As another ancillary issue, the POS module 110 can print various reports. The reports can be used to identify and track various kinds of check payments. The reports can provide any type (and combination) of information relevant to the transactions. For instance, the reports can focus on the business as a whole, a particular transaction device (or devices) within the business, checks processed using the electronic transaction methods, checks processed using the verification method, checks processed using the traditional method, and so on.

C. Representative Processing Functionality

FIG. 21 sets forth illustrative processing functionality 2100 that can be used to implement any aspect of functions described above. With reference to FIG. 1, for example, the type of processing functionality shown in FIG. 21 can be used to implement the transaction functionality 108 provided by the transaction device 102.

The processing functionality 2100 can include volatile and non-volatile memory, such as RAM 2102 and ROM 2104, as well as one or more processing devices 2106. The processing functionality 2100 also optionally includes various media devices 2108, such as a hard disk module, an optical disk module, and so forth. The processing functionality 2100 can perform various operations identified above when the processing device(s) 2106 executes instructions that are maintained by memory (e.g., RAM 2102, ROM 2104, or elsewhere). More generally, instructions and other information can be stored on any computer-readable medium 2110, including, but not limited to, static memory storage devices, magnetic storage devices, optical storage devices, and so on. The term computer-readable medium also encompasses plural storage devices. The term computer-readable medium also encompasses signals transmitted from a first location to a second location, e.g., via wire, cable, wireless transmission, etc.

The processing functionality 2100 also includes an input/output module 2112 for receiving various inputs from a user (via input modules 2114), and for providing various outputs to the user (via output modules). One particular output mechanism may include a presentation module 2116 and an associated graphical user interface (GUI) 2118. The processing functionality 2100 can also include one or more network interfaces 2120 for exchanging data with other devices via one or more communication conduits 2122. One or more communication buses 2124 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer readable medium that is not a signal, the computer readable medium having stored thereon computer executable instructions that, when executed by a computer, cause the computer to:

execute a point-of-sale transaction module configured to perform a transaction using a selected add-in module selected from a plurality of add-in modules, each of the plurality of add-in modules being configured to process a check during the transaction using a transaction flow associated with the add-in module;

execute a point-of-sale configuration module for identifying the transaction flow associated with the selected add-in module, the transaction flow comprising operations to be completed during the transaction and being selected by the point-of-sale configuration module from a plurality of transaction flows;

execute a point-of-sale-to-add-in interface module comprising a plurality of application programming interfaces configured to generate a call to the selected add-in module for transmitting an authorization request to the selected add-in module, and receive an authorization response from the add-in modules during execution of the transaction flow for indicating if the transaction has been approved by the selected add-in module; and execute a point-of-sale settlement module configured to perform settlement of the transactions performed using the selected add-in module, wherein the point of sale module is configured to complete the transaction using the selected add-in module by communicating with a service provider associated with the selected add-in module using a protocol associated with the service provider to determine information used during the transaction, obtaining, from the service provider, the information used during the transaction, processing the check using the information by executing the transaction flow associated with the selected add-in module, and settling the transaction, using the point-of-sale settlement module.

2. The computer readable medium of claim 1, wherein at least one of the plurality of add-in modules is configured to process the check by completing an electronic transaction based on information associated with the check.

3. The computer readable medium of claim 1, wherein at least one of the plurality of add-in modules is configured to electronically verify an account associated with the check.

4. The computer readable medium of claim 1, wherein the point-of-sale-to-add-in interface module is further configured to instruct the selected add-in module to perform settlement of the transaction.

5. The computer readable medium of claim 1, wherein the a point-of-sale-to-add-in interface module is further configured to identify each of the plurality of add-in modules using unique identification data.

6. The computer readable medium of claim 1, wherein the a point-of-sale-to-add-in interface module is further configured to transmit a batch size request to the selected add-in module, and to receive a batch size response from the selected add-in module, the batch size response identifying a maximum size of batches processed by the selected add-in module.

7. The computer readable medium of claim 1, wherein the point of sale module is further configured to determine if a print validation protocol is to be used and if a printing device is configured and available, and in response to determining that the print validation protocol is to be used and that the printing device is configured and available, print deposit information on the check.

8. A method for performing a transaction involving a check, the method comprising:

detecting, at a point-of-sale module executed by a computer, initiation of the transaction;

presenting, using the point-of-sale module, a plurality of options for selecting a selected add-in-module from a plurality of add-in modules, each of the plurality of add-in modules being configured to process the check during the transaction using a transaction flow associated with the add-in module;

receiving, at the point-of-sale module, a selection of a selected add-in module; and using a point-of-sale settlement module executed by the computer to communicate with a service provider associated with the selected add-in module to obtain information used to process the check; and using the point-of sale settlement module to execute a transaction flow associated with the selected add-in module to generate a call to the selected add-in module for transmitting an authorization request to the selected add-in module, receive an authorization response from the add-in modules during execution of the transaction flow for indicating if the transaction has been approved by the selected add-in module, process the check using the information, and settle the transaction.

9. The method of claim 8, wherein presenting the plurality of add-in modules comprises:

presenting a user interface for selecting one or more of the plurality of add-in modules for processing the check during the transaction; and receiving a selection of the one or more of the plurality of add-in modules via the user interface.

10. The method of claim 8, further comprising:

presenting a user interface for configuring the selected add-in module, the user interface being provided by the selected add-in module; and receiving configuration information via the user interface.

11. The method of claim 10, further comprising distributing the configuration information to another computer executing another point-of-sale module.

12. The method of claim 8, further comprising:

determining if a print validation protocol is to be used and if a printing device is configured and available; and in response to determining that the print validation protocol is to be used and that the printing device is configured and available, printing deposit information on the check.

13. A method for processing a check during a transaction, the method comprising:

receiving, at a point-of-sale module executed by a computer, selection of a check payment method for use in processing the check during the transaction, the selected check payment method being associated with a selected add-in module selected from a plurality of add-in modules and configured to process the check using a transaction flow associated with the selected add-in module;

configuring the selected add-in module by identifying a transaction flow associated with the selected add-in module, the transaction flow comprising operations to be completed during the transaction and being selected from a plurality of transaction flows stored at the computer; and executing a point-of-sale settlement module at the computer to perform the transaction in accordance with the selected check payment method by executing the transaction flow associated with the selected add-in module to communicate with a service provider associated with the selected add-in module using a protocol associated with the service provider to request obtain information used to process the check, receive the information from the service provider, process the check using the information, and settle the transaction.

14. The method of claim 13, wherein receiving selection of the check payment method comprises receiving selection of the check payment method from a plurality of check payment methods associated with a plurality of add-in modules, and wherein the plurality of check payment methods include converting the check into an electronic transaction, electronically verifying that an account associated with the check may be used for payment during the transaction, and completing the transaction without converting the check into the electronic transaction or electronically verifying the account.

15. The method of claim 13, further comprising:

sending an authorization request to the selected add-in module; and receiving an authorization response from the selected add-in module, the authorization response indicating whether processing the check has been authorized.

16. The method of claim 13, further comprising:

receiving instructions to void the transaction;

determining if the transaction has been settled;

in response to determining that the transaction has not been settled, creating void status information for processing by the selected add-in module to void the transaction; and in response to determining that the transaction has been settled, processing a return transaction.

17. The method of claim 13, further comprising:

determining if a print validation protocol is to be used and if a printing device is configured and available; and in response to determining that the print validation protocol is to be used and that the printing device is configured and available, printing deposit information on the check.

18. The method of claim 13, further comprising:

receiving instructions to void the transaction;

determining if the transaction has been settled; and in response to determining that the transaction has not been settled, creating void status information for processing by the selected add-in module to void the transaction, and printing information on the check indicating that the check is void.

* * * * *